US006526424B2

(12) United States Patent
Kanno et al.

(10) Patent No.: US 6,526,424 B2
(45) Date of Patent: Feb. 25, 2003

(54) BROWSER IMAGE DISPLAY BOOKMARK SYSTEM

(75) Inventors: Hironori Kanno, Sendai (JP); Yoshiyuki Hirashima, Sendai (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/045,705

(22) Filed: Mar. 23, 1998

(65) Prior Publication Data

US 2001/0011285 A1 Aug. 2, 2001

(30) Foreign Application Priority Data

Sep. 29, 1997 (JP) .............................. 9-264478

(51) Int. Cl.$^7$ .................. G06F 17/00; G06F 17/21; G06F 15/16
(52) U.S. Cl. ............... 707/512; 707/501.1; 709/206
(58) Field of Search .............. 707/512, 501.1, 707/201, 513; 700/237; 709/2.24, 206

(56) References Cited

U.S. PATENT DOCUMENTS

| | | | | |
|---|---|---|---|---|
| 5,761,071 A | * | 6/1998 | Bernstein et al. | 700/237 |
| 5,890,164 A | * | 3/1999 | Nielsen | 707/201 |
| 5,918,237 A | * | 6/1999 | Montalbano | 707/513 |
| 5,923,845 A | * | 7/1999 | Kamiya et al. | 709/206 |
| 5,963,964 A | * | 10/1999 | Nielsen | 707/501 |
| 5,978,818 A | * | 11/1999 | Lin | 707/501 |
| 5,978,828 A | * | 11/1999 | Greer et al. | 709/2.24 |
| 6,065,055 A | * | 5/2000 | Hughes et al. | 709/229 |

FOREIGN PATENT DOCUMENTS

| | | |
|---|---|---|
| JP | 63-263530 | 10/1988 |
| JP | 1-291367 | 11/1989 |
| JP | 3-41559 | 2/1991 |
| JP | 5-233712 | 9/1993 |
| JP | 8-6956 | 1/1996 |

OTHER PUBLICATIONS

Berghel, Hal., Cyber–Surfing: the state–of–the–art in client server browsing and navigation, ACM Symposium on Applied Computing, pp. 1–4, Feb. 1995.*

Kosmynin, Arkadi, From Bookmark Managers to Distributed Indexing: An Evolutionary Way to the Next Generation of Search Engines, IEEE Communications Magazine, Jun. 1997, pp. 145–151.*

"Super Kid95 Internet Pack", *The Windows*, vol. 7, No. 2, Feb. 1, 1997, pp. 58–59.

T. Kobayashi, "Information Collection at Discount Times—Atomatic Circutlation Tool Used on a Web Network, For Data While Not Attended", *Oh PC*, vol. 16, No. 3, Jul. 1, 1997, pp. 217–221.

D. Yoshiwara, "Bookmark Superarrangement Method", *The Basic*, No. 166, Apr. 1997, pp. 46–47, and 49.

* cited by examiner

Primary Examiner—Joseph H. Feild
Assistant Examiner—William L. Bashore
(74) Attorney, Agent, or Firm—Staas & Halsey LLP

(57) ABSTRACT

An image display bookmark system is disclosed. The image display bookmark system comprises a bookmark processing unit and a data storing unit. The bookmark processing unit is disposed in a processing unit. The bookmark processing unit in the processing unit registers a reduced image of a page corresponding to a bookmark for each user of a WWW browser. When a user selects a reduced image that has been registered, the page is displayed on a GUI screen of the WWW browser. The system administrator can designate authority to register, change, and delete bookmarks to each user. An automatic traveling unit automatically travels pages corresponding to images that have been registered, updates the reduced images, titles, or URLs of the pages, and maintains the bookmarks as the latest information.

26 Claims, 17 Drawing Sheets

121 OPERATION CONTROL PARAMETER FILE

| ITEM | VALUE |
|---|---|
| USER ID MODE | NO |
| URL ACCESS RESTRICTION | YES |
| DEFALT USER ID | default |
| DEFALT PIXEL | x(250), y(300) |

FIG. 15A

122 USER MANAGEMENT FILE

| USER NAME | PASSWORD | REGISTRATION FILE | CHANGE FILE | DELETE FILE | AUTOMATIC TRAVEL (MINUTES) | LAST TRAVEL DATA/FILE | IMAGE SIZE |
|---|---|---|---|---|---|---|---|
| default | NONE | YES | NO | NO | 0 | 970810:123100 | x(20), y(30) |
| kenta | yyyyy | NO | NO | NO | 1440 | 970811:111200 | x(25), y(35) |
| yumi | ddddd | YES | NO | NO | 720 | 970801:091221 | x(40), y(30) |
| : | : | : | : | : | : | : | : |

FIG. 15B

123 BOOKMARK DATA FILE
USER ID: default

| TITLE | URL | IMAGE FILE NAME | COMMENT | COORDINATES OF IMAGE |
|---|---|---|---|---|
| xxx HOME Page | http:/www.xxx.co.jp | xxx1.bmp | hogehoge… | x(10,10) y(20,25) |
| : | : | : | : | : |

123 BOOKMARK DATA FILE
USER ID: kenta

FIG. 15C

| TITLE | URL | IMAGE FILE NAME | COMMENT | COORDINATES OF IMAGE |
|---|---|---|---|---|
| xxx HOME Page | http:/www.xxx.co.jp | xxx1.bmp | hogehoge… | x(10,10) y(20,25) |
| : | : | : | : | : |

124 REDUCED IMAGE DATA FILE

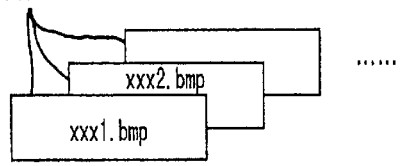

FIG. 15D

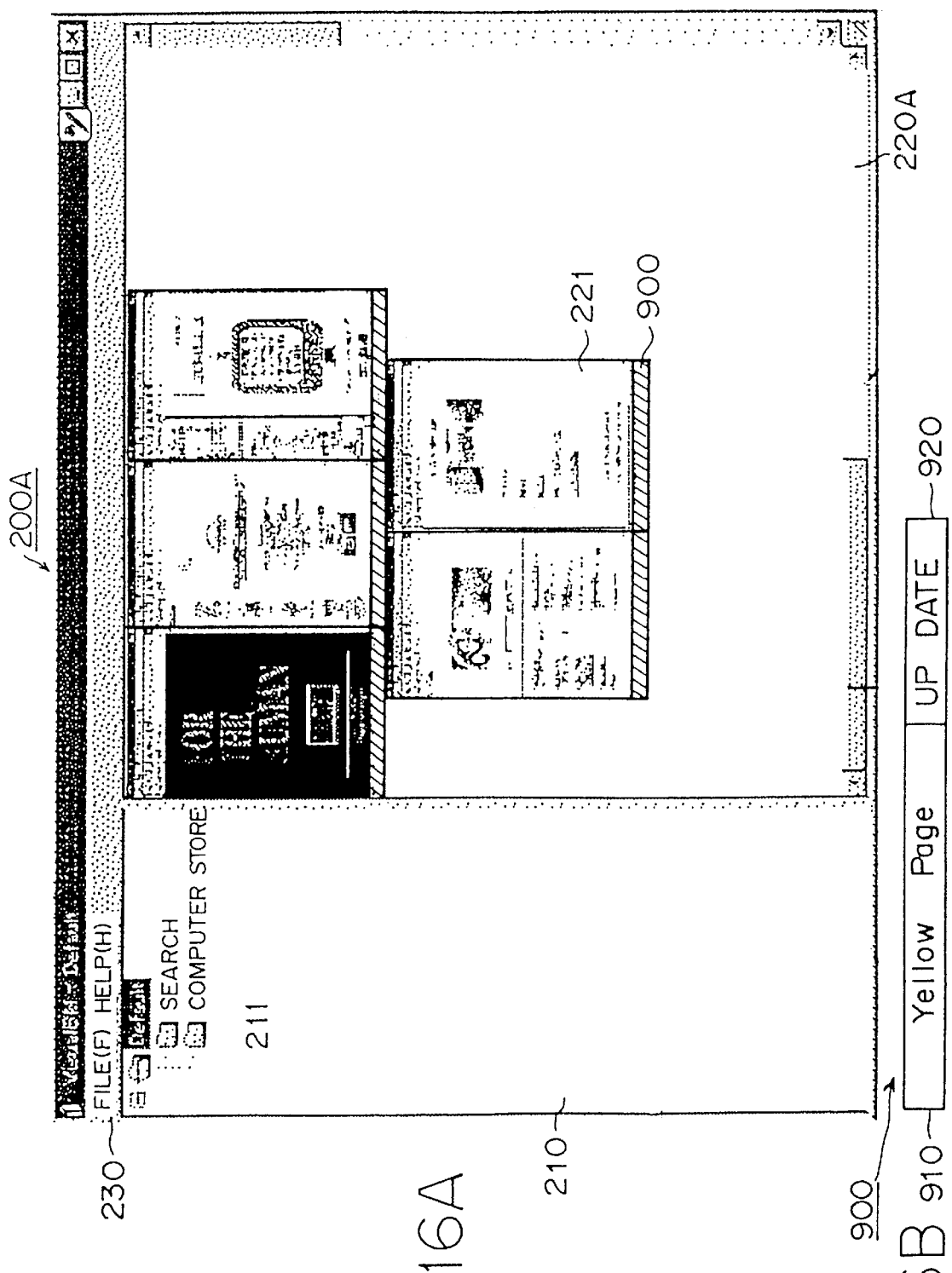

BROWSER IMAGE DISPLAY BOOKMARK SYSTEM

BACKGROUND OF THE INVENTION

1. Field of the Invention

The present invention relates to a WWW (World Wide Web) browser system for browsing the WWW on the Internet, in particular, an image display bookmark system for registering each WWW page as a reduced image so as to allow a user to more visually and effectively select a desired WWW page.

2. Description of the Related Art

In recent years, an increasing number of WWW pages has been browsed and created on the Internet. Many tools and books for browsing and creating WWW pages have been marketed. The WWW is a global information network structured on the Internet. The WWW page is a unit of information composing a web document. The WWW page is composed of an HTML (Hyper Text Markup Language) document, related image data, and so forth that are stored in a WWW server on the WWW. The HTML is a kind of format based on SGML (Standard Generalized Markup Language) used in CALS (Continuous Acquisition and Lifecycle Support).

A WWW browser receives a WWW page corresponding to a protocol referred to as HTTP (Hyper Text Transmission Protocol) from a web site and causes a display of a computer that operates the WWW browser to display the received page. With a WWW page, the WWW browser provides the user with text information (such as ASCII character data), image information composed of graphics data, audio information, moving picture information, and so forth. Thus, the user of the WWW browser can browse global information at home. In addition, the user can transmit a page that he or she has created to the world.

In the following description, it is assumed that a displaying operation for a page performed by the WWW browser includes an output operation of so-called multimedia information such as audio information and moving picture information as well as text information and image information.

Data such as an HTML document and image data for the above-described web page is stored in a directory for each user of the WWW server on the WWW. Users include people, governments, companies, and other organizations. Each user can hierarchically structure pages by designating them on the HTML document. The top page of each user is especially referred to as "home page". Each user can designate links (entrances) to other pages on the "home page". Each linked page may have several links to other pages. These links are normally referred to as "hyper-links". The "hyper-links" are displayed as symbols representing the linked pages (for example, addresses of the pages and images that indirectly represent the contents of the pages).

The user of the WWW browser generally clicks a symbol with a mouse so as to switch the current page to a desired page (namely, jump to a linked page). As the linked page, the user can designate a higher hierarchical page and any desired page of another web site as well as a lower hierarchical page. To designate a desired page in the above-described HTML document, an address for identifying an individual page on the Internet is used. This address is referred to as a URL (Uniform Resource Locator). An example of this address is "http://www.xxx.co.jp/Sample/Sample.html".

When the user of the WWW browser clicks a symbol that represents another page on the current page displayed by the WWW browser, he or she can switch the current page to another page. The user can repeat this operation to display pages one after another. At this point, the WWW browser obtains the URL of the relevant page correlated to the clicked symbol with an HTML code (tag) referred to as an ANCHOR from the HTML document that is currently being displayed. Thereafter, the WWW browser accesses the WWW server with the address represented by the URL through the Internet. The WWW browser downloads the relevant data (namely, an HTML document of the relevant page and other data in association therewith) stored in the WWW server to the memory or storing unit of the computer that operates the WWW browser through the Internet.

Next, after the WWW browser has downloaded such data or while downloading, the WWW browser displays the data or a part of the data as a page on the display unit of the computer.

As currently common WWW browsers, there are Netscape Navigator, Microsoft Internet Explorer, and so forth. These WWW browsers have the above-described function.

Instead of the browsing method for switching pages one after the other (this method is referred to as "net-surfing"), when the user knows a URL of a desired page, he or she can directly type the URL in the location designation area on the GUI (Graphical User Interface) screen of the WWW browser. However, depending on a user, he or she may daily browse particular pages for stock market information, news, and so forth. In this situation, it is inconvenient and inefficient for the user to type long character strings for such URLs. To solve such a problem, the WWW browsers generally have a "bookmark function".

The "bookmark" function of the WWW browsers serves to register favorite sites and pages on the Internet. With the "bookmark" function, the user registers the URL of a desired page as one element of the bookmark data. After displaying a list of pages registered as bookmarks, the user can click a desired page with the mouse or the like to select that page. Thus, the user can directly see the desired page without needing to type a long character string for the URL that represents the desired page, and without any waste of time due to a typing error.

FIG. 1 is a schematic diagram showing a typical bookmark display screen 10. As shown in FIG. 1, bookmarks can be hierarchically managed. A set of bookmarks 12 can be managed and can comprise a folder 11. Thus, the user can categorize the bookmarks 12 as groups. Thus, even if there are many bookmarks, the user can effectively access a desired bookmark 12. For example, in the bookmark display screen 10 shown in FIG. 1, bookmarks 12 that are "People" and "Yellow Pages" have been registered in a folder 11 that is called "Lookup". When the user clicks the folder "Lookup" with the mouse or the like, the bookmarks "People" and "Yellow Pages" are displayed as a list as shown in FIG. 1.

As titles for identifying the bookmarks "People" and "Yellow Pages", titles of pages corresponding to the bookmarks are directly used. When the user of the WWW browser double-clicks a line (object) of a desired bookmark 12 such as "People" on the bookmark display screen 10 with the mouse or clicks a line of a desired bookmark 12 on a pop-up window (not shown) that simply displays bookmarks 12 with the mouse, he or she can easily select and display the desired page.

When the user wants to add a bookmark 12 of which he or she found a desired page after typing a URL in the location area of the WWW browser or performing the net-surfing, he or she clicks "Add Bookmark" with the mouse or the like while the WWW browser is displaying the desired page. At this point, the URL of the page and the title thereof are automatically registered as a bookmark 12. The title of the page is used as the title of the registered bookmark 12. When the user newly adds a bookmark 12 on the bookmark display screen 10 shown in FIG. 1, he or she can type the URL, the title, and so forth so as to add a new bookmark 12 to the desired folder 11.

The bookmarks 12 displayed on the bookmark display screen 10 shown in FIG. 1 include information such as the URLs of the pages, the titles thereof, and the comments of the users of the WWW browser. The user can edit such information on a bookmark edit screen (not shown) that is displayed by selecting a property of a relevant bookmark 12 with the mouse on the bookmark display screen 10 shown in FIG. 1. In addition, the user can delete or move a bookmark 12 (to the current folder or another folder) on the bookmark display screen 10 shown in FIG. 1.

As described above, with the bookmark function of the conventional browser, the user can select a desired bookmark from those that have been registered with the mouse or the like so that the WWW browser displays a desired page.

However, titles of bookmarks are designated by those who created pages thereof. Thus, many titles are composed of long or obscure character strings. In addition, many URLs of pages are composed of long character strings. Thus, with these titles and URLS, the user cannot easily identify bookmarks (or pages thereof). For example, the titles of bookmarks displayed on the bookmark display screen are the same as the titles of the pages. The titles may be displayed in very small fonts or foreign characters. Thus, with such titles, aged people and children cannot easily distinguish pages.

In addition, the bookmark function of the conventional WWW browsers allows all the users thereof to register (add), delete, and correct all bookmarks. Thus, these browsers do not prohibit specific users from performing such operations. For example, when the conventional WWW browsers with such a bookmark function are used in the educational field, the registering operation and correcting operation of bookmarks cannot be restricted to teachers. In addition, pupils cannot be prohibited from performing the registering operation and correcting operation for pages that are not suitable in the educational field.

Moreover, in the conventional WWW browsers, even if only authorized people can register and correct bookmarks to deal with such problems, when other people directly input a URL of such an improper page in the location designation area on the GUI screen of the WWW browser, they can access it.

In addition, in the bookmark function of the conventional WWW browsers, when a URL or a title of a page on the Internet is changed, the URL or the title of the page is not automatically reflected in the corresponding bookmark. In recent years, providers and WWW servers on the Internet are being merged and closed every day. Thus, the URLs and the titles of web pages are being changed every day. In such a situation, with the conventional bookmark function, the changes of URLs or titles of pages do not automatically affect URLs or titles of pages registered as bookmarks. Thus, information of URLs or titles of pages registered as bookmarks become out-of-date information in short time. In particular, when a URL of a page was changed, unless the user of the WWW browser corrects the URL on the bookmark edit screen, or accesses the page of the changed URL and re-registers a bookmark thereof, he or she cannot properly access the page whose URL was changed. In addition, when a title of a page was changed, although the user can access it without a difficulty, the title registered as a bookmark does not match the title of the page he or she has accessed before.

SUMMARY OF THE INVENTION

To solve such problems, an object of the present invention is to provide a function for registering a reduced image of a page to be registered as bookmark data, a function for displaying the reduced images for all pages registered as bookmarks as icons for selecting a desired page, a function for restricting each user of the WWW browser from performing the registering (adding), deleting, and correcting bookmarks, a function for prohibiting each user from directly inputting an address of a page, a function for automatically traveling pages that have been registered as bookmarks and obtaining the latest information of the images, URLs, or titles of pages, and a function for reflecting the latest information to bookmark data of the relevant pages.

A first aspect (claim 1) of the present invention is an image display bookmark system for managing bookmark information used by a WWW browser, comprising a creating unit for creating bookmark information that includes at least image information for an image of a page displayed by the WWW browser and address information of the page, a bookmark registering unit for registering the bookmark information created by the creating unit to storing unit, a reading unit for reading the bookmark information stored in the storing unit, and a bookmark display controlling unit for displaying an image for identifying the page on a screen corresponding to image information included in the bookmark information that has been read by the reading unit. Thus, a bookmark can be registered in such a manner that it correlates to the image of the page displayed by the WWW browser. In addition, a bookmark can be displayed on the screen in such a manner that the bookmark correlates to the image of the page displayed by the WWW browser.

A second aspect (claim 2) of the present invention is an image display bookmark system for managing bookmark information used by a WWW browser, comprising a reading unit for reading bookmark information that includes information of an image from storing unit when the image is selected corresponding to the information of the image for a page displayed by the WWW browser on a screen, an obtaining unit for obtaining the image of the page corresponding to address information registered in the bookmark information that has been read by the reading unit, and a WWW page display controlling unit for displaying the image of the page obtained by the obtaining unit on a screen. Thus, when a user selects a bookmark that is displayed in such a manner that it correlates to an image of a page, a page corresponding to the bookmark can be displayed on the screen.

A third aspect (claim 3) of the present invention is an image display bookmark system for managing bookmark information used by a WWW browser, comprising bookmark information that is stored in storing unit and that includes at least image information of a page displayed by the WWW browser and address information of the page, and a bookmark editing unit for editing the content of the bookmark information. Thus, the content of the bookmark information can be edited.

A fourth aspect (claim 4) of the present invention is an image display bookmark system as set forth in claim 3, wherein the bookmark editing unit changes the address information included in the bookmark information. Thus, the address information included in the bookmark information can be changed.

A fifth aspect (claim 5) of the present invention is an image display bookmark system as set forth in claim 3, wherein the bookmark editing unit newly adds the bookmark information. Thus, the bookmark information including the address information can be newly added.

A sixth aspect (claim 6) of the present invention is an image display bookmark system as set forth in claim 3, wherein the bookmark editing unit deletes the bookmark information. Thus, the bookmark information that is stored can be deleted.

A seventh aspect (claim 7) of the present invention is an bookmark system for managing bookmark information used by a WWW browser, comprising a bookmark registering unit for registering the bookmark information that includes at least image information for an image of a page displayed by the WWW browser, address information of the page, and title information of the page to storing unit, and a bookmark display controlling unit for reading the bookmark information stored in the storing unit and displaying an image for identifying the page corresponding to image information for the image of the page that is included in the bookmark information and that is displayed by the WWW browser. Thus, the image information for the image of the page displayed by the WWW browser and the bookmark information including the title information of the page can be registered. In addition, a bookmark can be displayed on the screen in such a manner that the bookmark correlates to the image of the page displayed by the WWW browser.

An eighth aspect (claim 8) of the present invention is an image display bookmark system as set forth in claim 7, further comprising a title information display controlling unit for displaying the title information of the page in the bookmark information registered in the storing unit in such a manner that the title information correlates with the image for identifying the page that has been displayed. Thus, the title information of the page can be displayed in such a manner that it correlates to the image of the page.

A ninth aspect (claim 9) of the present invention is an image display bookmark system for managing bookmark information used by a WWW browser, comprising a bookmark registering unit for registering bookmark information to storing unit, the bookmark information including at least image information of a page displayed by the WWW browser, title information of the page, and update information that represents whether or not the address information of the page or the content of the page has been changed after the preceding accessing operation has been performed, and a bookmark display controlling unit for reading the bookmark information stored in the storing unit and displaying an image for identifying a page created corresponding to image information for an image of the page that is included in the bookmark information and that is displayed by the WWW browser and information corresponding to the update information together on a screen. Thus, the image of the update information can be displayed along with the image information of the image of the page displayed by the WWW browser.

A tenth aspect (claim 10) of the present invention is an image display bookmark system for managing bookmark information used by a WWW browser, comprising an accessing means for automatically accessing a page of an address designated by address information of a page included in each record of bookmark information stored in storing unit corresponding to predetermined time information and obtaining change information of the page, and a registering unit for updating information included in the record of the bookmark information having the address information of the page corresponding to change information of the page obtained by the accessing unit. Thus, the page at the address included in the bookmark can be automatically accessed. The bookmark information can be updated to the latest information.

An eleventh aspect (claim 11) of the present invention is an image display bookmark system as set forth in claim 10, wherein the change information is information that represents that a display content of the page has been changed. Thus, the information that represents that the display content of the page was changed can be displayed along with the image information of the image of the page displayed by the WWW browser.

A twelfth aspect (claim 12) of the present invention is an image display bookmark system as set forth in claim 10, wherein the change information is information that represents that an address of the page has been changed. Thus, the information that represents that the address of the page was changed can be displayed along with the image information of the image of the page displayed by the WWW browser.

A thirteenth aspect (claim 13) of the present invention is an image display bookmark system as set forth in claim 10, wherein the change information is information that represents that a title of the page has been changed. Thus, the information that represents that the title of the page was changed can be displayed on the screen along with the image information of the image of the page displayed by the WWW browser.

A fourteenth aspect (claim 14) of the present invention is an image display bookmark system as set forth in claim 10, wherein the change information is information that represents that at least two of a display content of the page, an address thereof, and a title thereof have been changed. Thus, the information that represents that at least two of the display content of the page, the address thereof, and the title thereof can be displayed on the screen along with the image information of the image of the page displayed by the WWW browser.

A fifteenth aspect (claim 15) of the present invention is an image display bookmark system as set forth in claim 10, wherein the accessing unit accesses an address of address change information that represents a new address of the page and obtains change information of the page when the page of the address represented by the address information of the page included in the bookmark information is accessed. Thus, even if the address of the page was changed, the new address can be accessed. Consequently, the latest page can be displayed on the screen.

A sixteenth aspect (claims 16, 17, 18, 19, and 20) of the present invention is an image display bookmark system as set forth in one of claims 1, 2, 3, 7, and 9, wherein the image information of the image that is included in the bookmark information and that is displayed by the WWW browser includes information of a reduced image of the page displayed by the WWW browser. Thus, a bookmark can be displayed with the reduced image of the image of the page displayed by the WWW browser.

A seventeenth aspect (claims 21, 22, 23, 24, 25, and 26) of the present invention is an image display bookmark system as set forth in one of claims 1, 2, 3, 7, 9, and 10, wherein the storing unit stores the bookmark information for each user, and wherein the operation for the bookmark information is performed for each user. Thus, the bookmark information can be managed for each user.

An eighteenth aspect (claims 27, 28, 29, 30, 31, and 32) of the present invention is an image display bookmark system as set forth in one of claims 21, 22, 23, 24, 25, and 26, further comprising a user authority defining unit for defining the authority for an editing operation for bookmark information for each user, and a controlling unit for prohibiting each user from displaying an image of a page in other than an operation for selecting an image displayed corresponding to image information included in the bookmark information corresponding to the authority for each user defined by the user authority defining unit. Thus, the editing operation of the bookmark information is defined for each user. Each user is restricted from displaying other than the image of the page registered as the bookmark.

A nineteenth aspect (claim 33) of the present invention is an image display bookmark system as set forth in claim 27, wherein the user authority defining unit defines the authority to register and add the bookmark information for each user. Thus, authority to register and add the bookmark information can be defined for each user.

A twentieth aspect (claim 34) of the present invention is an image display bookmark system as set forth in claim 27, wherein the user authority defining unit defines authority to change the bookmark information for each user. Thus, authority to change the bookmark information can be defined for each user.

A twenty-first aspect (claim 35) of the present invention is an image display bookmark system as set forth in claim 27, wherein the user authority defining unit defines the authority to define the bookmark information for each user. Thus, the authority to delete the bookmark information can be defined for each user.

A twenty-second aspect (claims 36, 37, 38, 39, 40, and 41) of the present invention is an image display bookmark system as set forth in one of claims 27, 28, 29, 30, 31, and 32, wherein only a predetermined administrator can use the user authority defining unit. Thus, only the predetermined administrator can define the authority for each user to edit the bookmark information.

A twenty-third aspect (claim 42) of the present invention is a method for displaying and selecting bookmark information used by a WWW browser, comprising the steps of registering bookmark information including at least image information for an image of a page displayed by the WWW browser and address information of the page to storing unit, displaying an image for identifying a page corresponding to the image information for the image of the page included in the bookmark information registered in the storing unit on a screen of displaying unit, and reading the bookmark information including image information for the image of the selected page from the storing unit, obtaining an image of a page at an address designated by address information of the page registered in the bookmark information that has been read, and displaying the image of the obtained page on a screen when the image for identifying the page is selected by the selecting unit. Thus, a bookmark can be registered in such a manner that it correlates to the image of the page displayed by the WWW browser. In addition, a bookmark can be displayed on the screen in such a manner that the bookmark correlates to the image of the page displayed by the WWW browser. Moreover, when a user selects a book-mark that is displayed in such a manner that it correlates to an image of a page, a page corresponding to the bookmark can be displayed on the screen.

A twenty-fourth aspect (claim 43) of the present invention is a storage medium from which a computer reads a program that causes the computer to accomplish a bookmark system for managing bookmark information used by a WWW browser, the bookmark system having the functions of registering bookmark information including at least image information for an image of a page displayed on a screen of displaying unit by the WWW browser and address information of the page to the storing unit, reading the image information for the image of the page included in the bookmark information from the storing unit and displaying an image for identifying the page corresponding to the image information on the screen of the displaying unit, and reading the bookmark information corresponding to the page from the storing unit, obtaining an image of a page at an address designated by the address information of a page registered in the bookmark information, and displaying the image of the obtained page on the screen of the displaying unit when an image for identifying the page is selected on the screen. Thus, a bookmark can be registered in such a manner that it correlates to the image of the page displayed by the WWW browser. In addition, a bookmark can be displayed on the screen in such a manner that the bookmark correlates to the image of the page displayed by the WWW browser. Moreover, when a user selects a bookmark that is displayed in such a manner that it correlates to an image of a page, a page corresponding to the bookmark can be displayed on the screen.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 15A is a table showing operation control parameters;

FIG. 15B is a table showing a user management file;

FIG. 15C is a table showing a bookmark data file;

FIG. 15D is a schematic diagram showing a reduced image data file;

FIG. 16A is a diagram showing a bookmark display screen of an image display bookmark system according to a second embodiment of the present invention;

FIG. 16B is a diagram showing a title and update information display portion of the image display bookmark system according to the second embodiment of the present invention.

DESCRIPTION OF THE PREFERRED EMBODIMENTS

Figure 1:
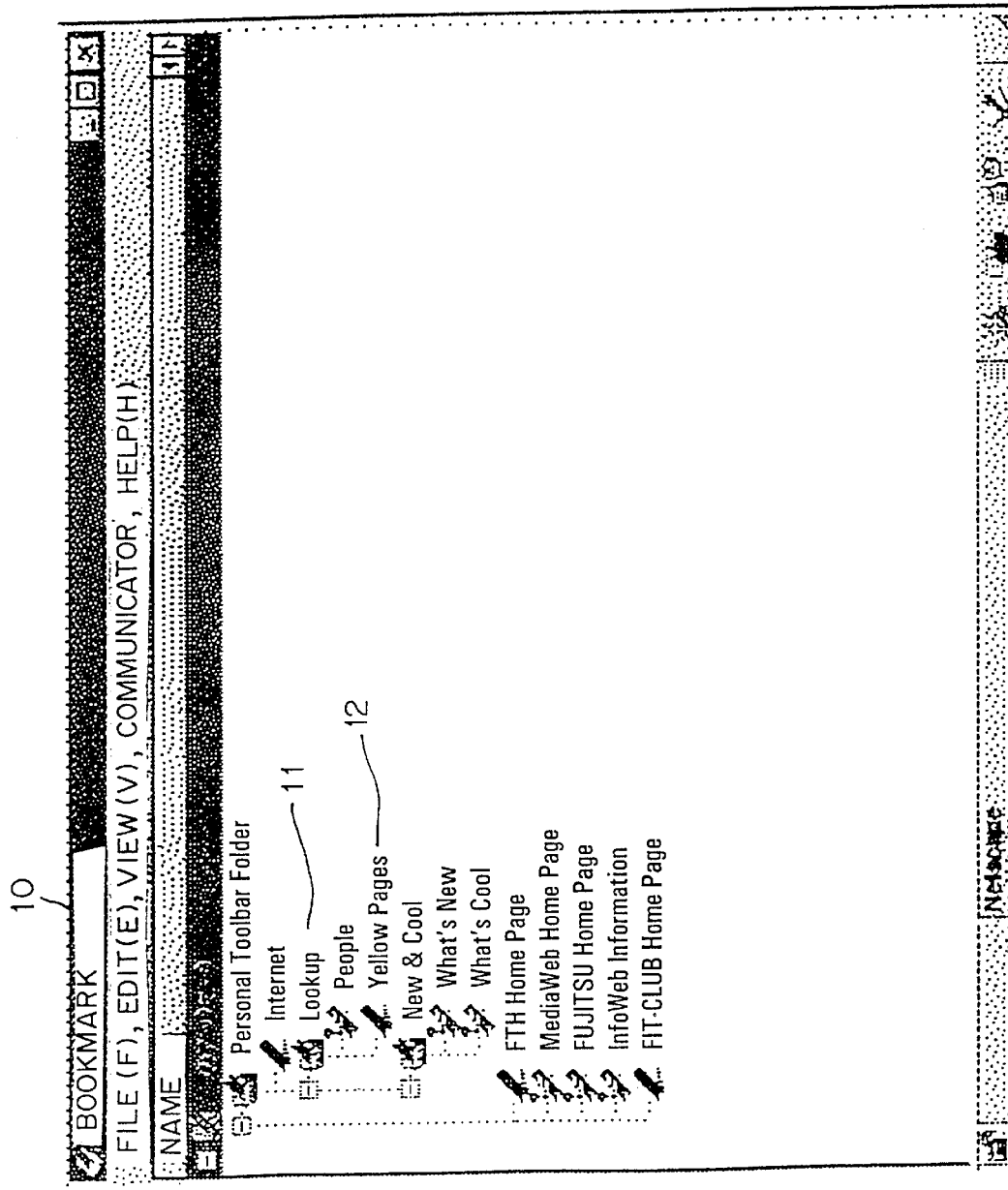
FIG. 1 is a diagram showing a conventional bookmark display screen.

Next, with reference to the accompanying drawings, embodiments of the present invention will be described. For simplicity, similar portions are denoted by similar reference numerals.

Figure 2:
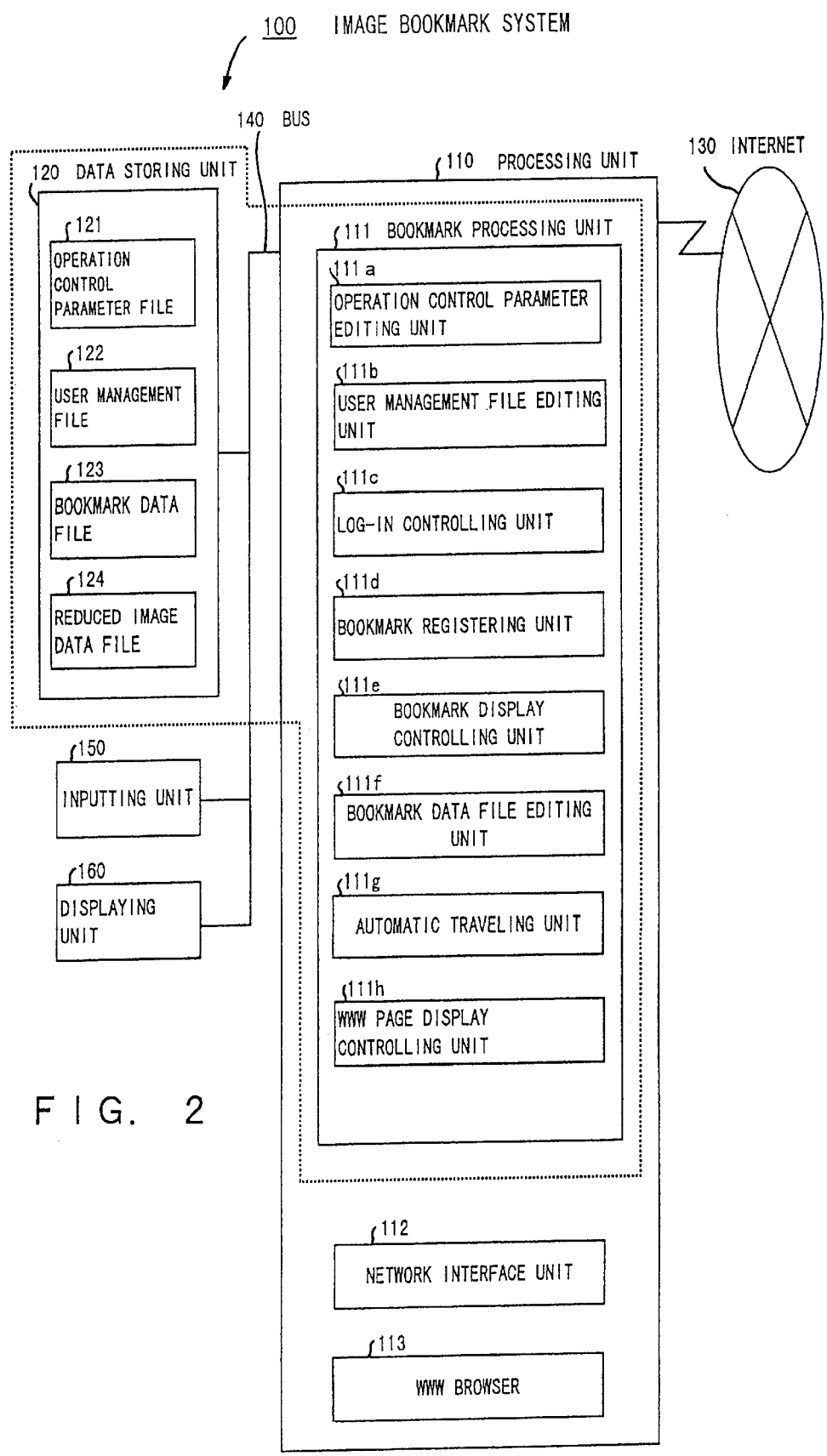
FIG. 2 is a block diagram showing an image display bookmark system according to an embodiment of the present invention.

FIG. 2 is a block diagram showing the structure of an image display bookmark system 100 according to an embodiment of the present invention. The image display bookmark system 100 is composed of a bookmark processing unit 111 and a data storing unit 120. The bookmark processing unit 111 is disposed in a processing unit 110. The processing unit 110 is normally a CPU of a personal computer, a UNIX workstation, or the like. The data storing unit 120 is normally a hard disk unit or another storing unit of the personal computer, the UNIX workstation, or the like. The processing unit 110 and the data storing unit 120 are connected to a bus 140 through an interface circuit (not shown). The processing unit 110 can reference or update data stored in the data storing unit 120 through the bus 140.

The processing unit 110 is connected to the Internet 130 with a network interface unit (communication controlling unit) 112 that is one function of the processing unit 110, by a dial-up connecting method with a public telephone line, a dedicated line connecting method with a dedicated line, or another connecting method. The processing unit 110 is connected to an inputting unit 150 and a displaying unit 160 through the bus 140. The inputting unit 150 is typically such as a keyboard and a mouse. The inputting unit 150 allows the user to input commands for causing the processing unit 110 to start up and perform other operations and to input data. The displaying unit 150 is typically such as a CRT display. The displaying unit 150 displays an input screen on which data and commands are input and an output screen to which processed results are output.

The processing unit 110 includes the bookmark processing unit 111, the network interface unit 112, and a WWW browser 113. The bookmark processing unit 111 includes an operation control parameter editing unit 111a, a user management file editing unit 111b, a log-in controlling unit 111c, a bookmark registering unit 111d, a bookmark display controlling unit 111e, a bookmark data file editing unit 111f, an automatic traveling unit 111g, and a WWW page display controlling unit 111h that are functional blocks. The bookmark processing unit 111 is provided as one function of the WWW browser 113. Alternatively, the bookmark processing unit 111 is provided as an in-line plug-in software package. Thus, the bookmark processing unit 111 extends bookmark functions of the WWW browser 113.

The data storing unit 120 includes an operation control parameter file 121, a user management file 122, a bookmark data file 123, and a reduced image data file 124.

The operation control parameter editing unit 111a designates various control parameters necessary for operating the image display bookmark system 100 and changes the various control parameters. The designated contents are stored in the operation control parameter file 121. The user management file editing unit 111b designates data for each user. The designated contents are stored in the user management file 122 for each user. The log-in controlling unit 111c manages log-ins of the administrator and general users to the image display bookmark system 100. When a user of the WWW browser 113 causes the image bookmark system 100 to register a bookmark, the bookmark registering unit 111d stores information for a page displayed by the WWW browser 113 in the bookmark data file 123. The bookmark display controlling unit 111e displays a registered bookmark as an image (icon) on the bookmark display screen corresponding to the designated contents of the operation control parameter file 121 and the user management file 122. The bookmark data file editing unit 111f edits part of the contents of the bookmark data file 123 created for each user. The automatic traveling unit 111g accesses a page corresponding to a registered bookmark in the bookmark data file 123 based on automatic travel designated time information stored in the user management file 122, for example, at a predetermined time or every predetermined time period and automatically updates the bookmark data to the latest information. The WWW page display controlling unit 111h accesses the URL registered in the designated bookmark in the bookmark data file 123 corresponding to the designated bookmark (icon) of the WWW browser 113 through the Internet 130, obtains an HTML document of the page registered to the bookmark, and sends the obtained HTML document to the WWW browser 113. The WWW browser 113 causes the displaying unit 160 to display the image of the page. Alternatively, the WWW page display controlling unit 111h sends the URL obtained from the bookmark to the WWW browser 113 and requests the WWW browser 113 to perform the above-described accessing process and the display controlling process.

Next, with reference to FIGS. 3A to 16B, the operation of the image display bookmark system 100 will be described.

Figure 3A:
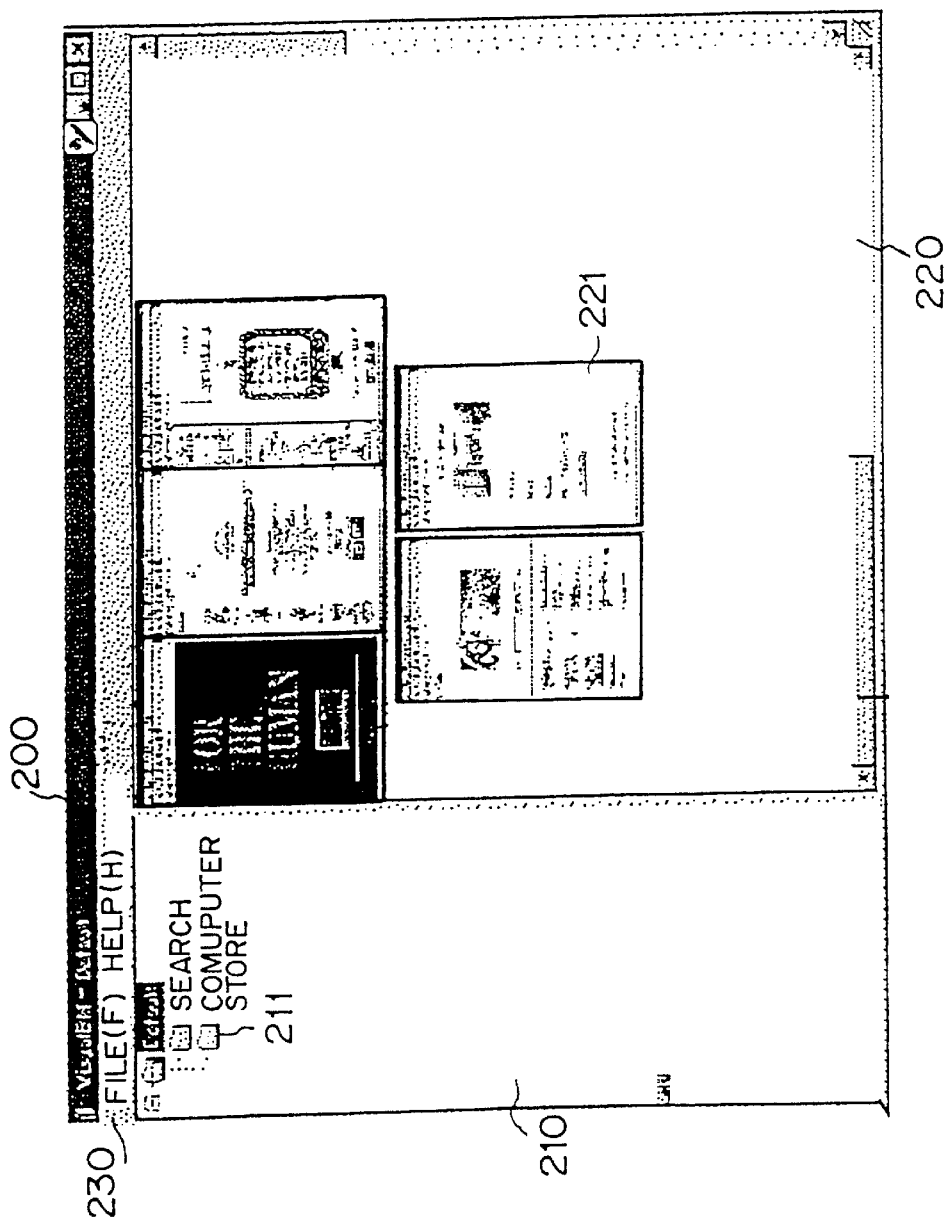
FIG. 3A is a diagram showing a bookmark display screen of the image display bookmark system according to a first embodiment of the present invention.

FIG. 3A shows an example of the bookmark display screen 200 of the image display bookmark system 100. The image display bookmark system 100 displays the bookmark display screen 200 that lists images of individual bookmarks that have been registered. When the user performs the operation for displaying the bookmark edit screen or the operation for displaying a bookmark on a pop-up window (for example, when the user presses the bookmark button on Netscape Navigator or the favorite button on Microsoft Internet Explorer), the WWW browser 113 displays the bookmark display screen 200.

The bookmark display screen 200 is composed of a menu portion 230, a folder display portion 210, and an image display portion 220. When the user clicks "File (F)" of the menu portion 230 with the mouse (not shown) or the like, a list of available operations is displayed on the bookmark display screen 200 as a pull-down menu. Next, with reference to FIG. 3B, the pull-down menu 240 will be described in detail.

When the user clicks a "Help (H)" portion of the menu portion 230 with the mouse or the like, help information for operations of the bookmark display screen 200 is displayed in a predetermined format. Several folders each of which stores a plurality of bookmarks are displayed on the folder display portion 210. Normally, each folder stores bookmarks of a predetermined category. Reduced images of pages corresponding to bookmarks in a selected folder are displayed on the image display portion 220. In this example, a folder "Default" has five bookmarks. Five reduced images (icons) 221 of pages corresponding to the five bookmarks are displayed. The folder "Default" has two sub-folders "Search" and "Computer Store" 211 in addition to the five bookmarks. When the user selects such a sub-holder in the folder display portion 210, reduced images 221 of pages corresponding to all bookmarks in the selected folder 211 are displayed in the image display portion 220.

When the user clicks the image 221 on the image display portion 220 with the mouse or the like, the WWW browser 113 accesses the web site of the URL of the bookmark corresponding to the image 221 through the Internet 130. Thus, the WWW browser 113 displays the page corresponding to the selected image 221 on a page display portion (not shown) of the GUI screen. The image 221 is displayed at a predetermined position by the bookmark display controlling unit 111e corresponding to a predetermined rule. However, the user can freely change the display position of each image 221 by dragging it with the mouse or the like.

Figure 3B:
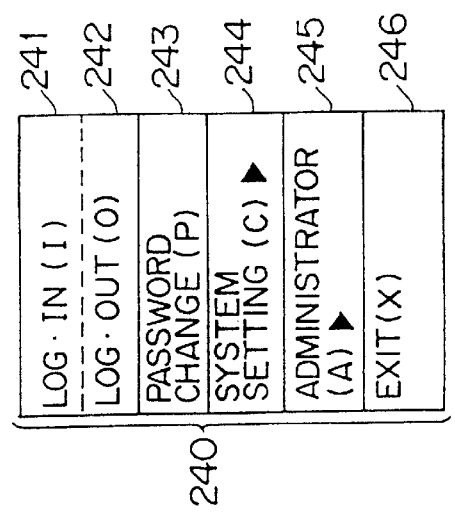
FIG. 3B is a schematic diagram showing a menu structure of the image display bookmark system according to the first embodiment of the present invention.

FIG. 3B shows the operation menu 240 of the bookmark display screen 200 as a pull-down menu in the case that the user selects the "File (F)" portion of the menu portion 230 shown in FIG. 3A. When the user selects one of portions "Log-in (I)" 241 to "Exit" 246 with the mouse or the like, the WWW browser 113 executes the operation corresponding to the selected portion.

When the user selects the "Log-in" portion 241, the image display bookmark system 100 displays a general user's log-in screen. The log-in controlling unit 111c checks out the user ID and password that are input through the log-in screen (see FIG. 8). The details of this operation will be described later. When the user selects a "Log-out (O)" portion 242, the image display bookmark system 100 quits the log-in operation for the current general user, and allows a new user to log-in. When the user selects a "Password Change (P)" portion 243, the image display bookmark system 100 displays a password change screen (not shown) for the password of the user who has logged in. On the password change screen, the user can change his or her password.

Each general user can change only his or her own password. However, the image display bookmark system 100 may be structured so that the system administrator can register and change the passwords of all users. When the user selects a "System Setting (C)" portion 244, the image display bookmark system 100 displays a sub-menu 400 (FIG. 5) having a "User Management (U)" portion and a "URL Restriction (A)". When the user selects each portion of the sub-menu, the image display bookmark system 100 displays a screen on which he or she can register or change each item of the user management file 122. This operation will be described later.

Figure 7:
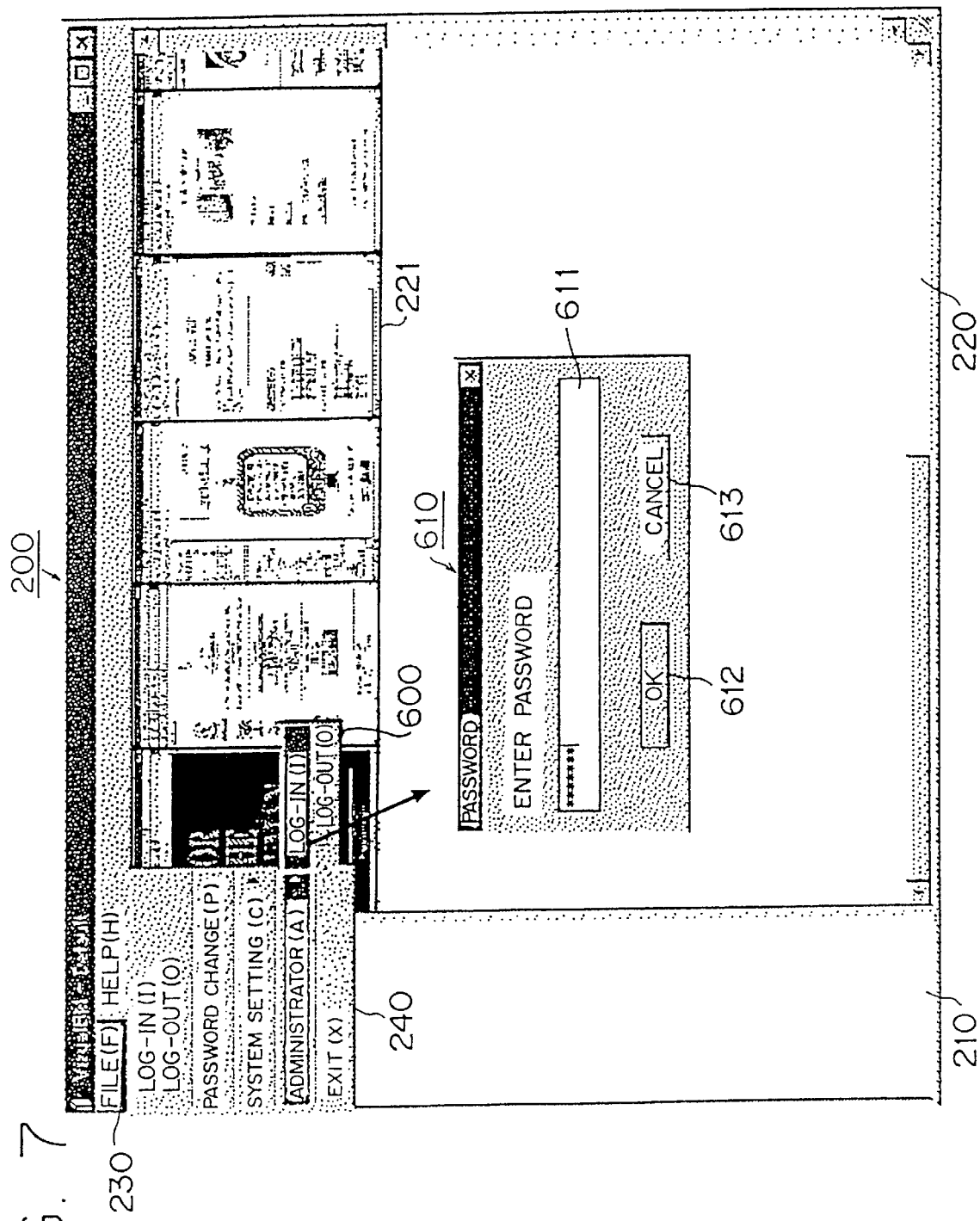
FIG. 7 is a diagram showing a password designation screen for a system administrator on the bookmark display screen of the image display bookmark system.

When the user selects an "Administrator (A)" portion 245, the image display bookmark system 100 displays a sub-menu 600 (see FIG. 7). The sub-menu 600 has a "Log-in (I)" portion and a "Log-out (O)" portion. When the user selects the "Log-in (I)" portion, the image display bookmark system 100 displays a screen on which the system administrator can input an own password. The log-in controlling unit 111c checks out the input password as with the general user's log-in operation. When the log-in controlling unit 111c has determined that the input password is valid, the image display bookmark system 100 gives the administrator a special authority that imposes restrictions for a URL access operation on a user (this operation will be described later). When the user selects the "Log-out (O)" portion on the sub-menu 600, the image display bookmark system 100 quits the current log-in operation for the next log-in operation (this operation will be described later). When the user selects an "Exit (X)" 246, the image display bookmark system 100 quits the process of the bookmark display controlling unit 111e that displays the bookmark display screen 200. However, the image display bookmark system 100 causes the WWW browser 113 to still display the page display portion.

Figure 4:
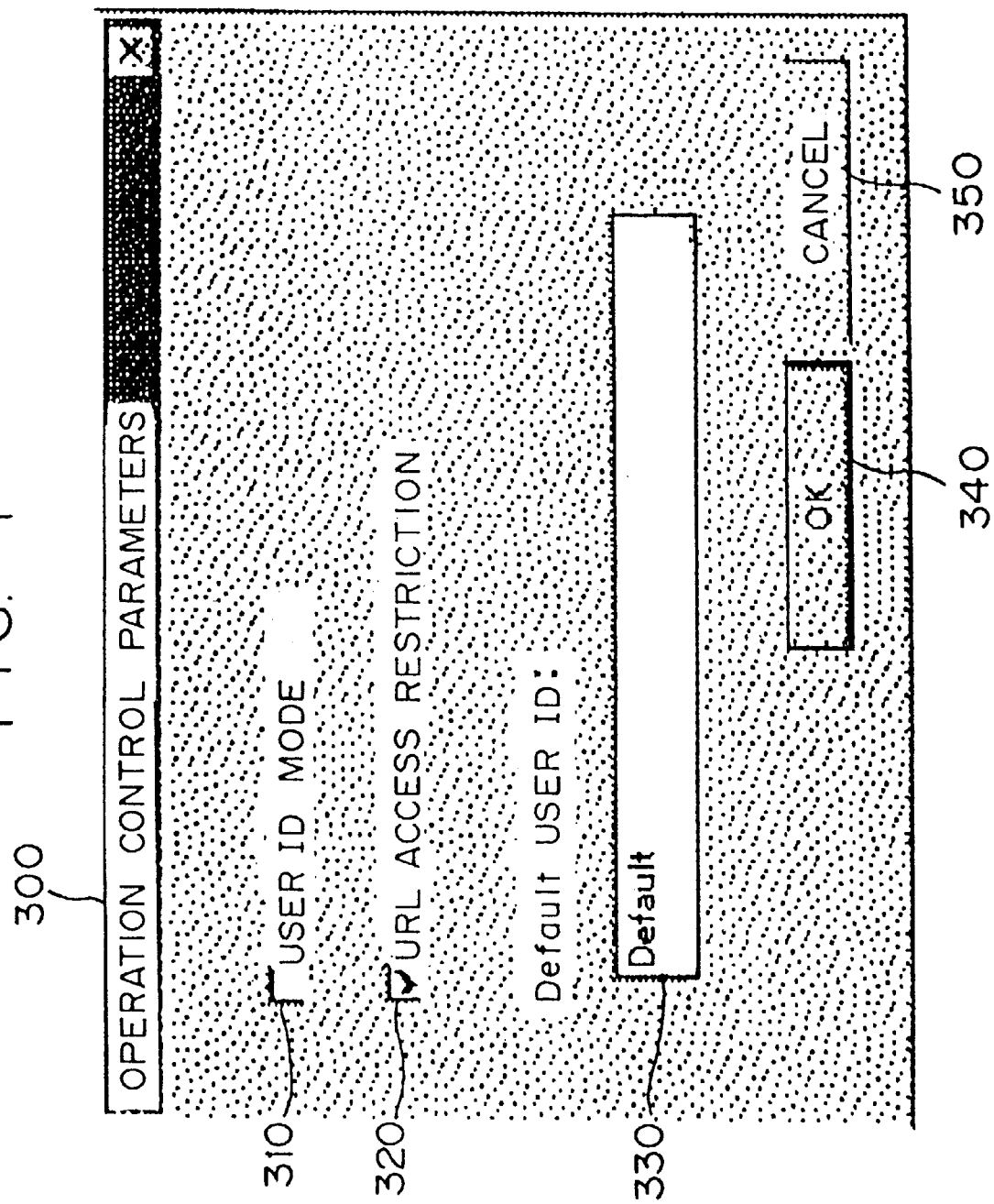
FIG. 4 is a diagram showing an operation control parameter designation screen.

FIG. 4 is a diagram showing an operation control parameter edit screen 300. The operation control parameter edit screen 300 is composed of a user ID mode designation area 310, a URL access restriction designation area 320, a default user ID designation area 330, an OK button 340, and a cancel button 350. The user ID mode designation area 310 and the URL access control designation area 320 are displayed as check boxes.

When the user selects a portion of the menu or a button of the page display portion or the bookmark display screen 200 of the WWW browser 113, the operation control parameter editing unit 111a gets started. At this point, the operation control parameter edit screen 300 is displayed as a pop-up window having input areas 310, 320, and 330 for the ID mode, the URL access restriction, and default user ID. As shown in FIG. 15A, in the operation control parameter file 121, the user ID mode parameter and the URL access restriction parameter are stored as YES or NO, or values corresponding to the characters. However, in the user ID mode designation area 310 and the URL access restriction designation area 320, for example YES and NO are converted into a check mark and a non-check mark, respectively. When the user selects (clicks) the OK button 340 with the mouse or the like, the operation control parameter editing unit 111a receives the content that is input through the operation control parameter edit screen 300, updates the content of the operation control parameter file 121 corresponding to the received content, and closes the operation control parameter edit screen 300. At this point, the input check information for the check boxes 310 and 320 is converted in the reverse manner. When the user selects the cancel button 350, the operation control parameter editing unit 111a closes the operation control parameter edit screen 300 without updating the content of the operation control parameter file 121 with the input data on the operation control parameter edit screen 300.

When the user ID mode parameter is Yes, the image display bookmark system 100 manages bookmarks for each user name stored in the user management file 122 shown in FIG. 15B. For example, in a bookmark data file 123 shown in FIG. 15C, a bookmark data for a user ID "default" and a bookmark data for a user ID "kenta" are separately managed. When the user ID mode parameter is No, the image display bookmark system 100 does not manage bookmarks for each user ID. In this case, the image display bookmark system 100 treats only a default user ID as a valid user ID.

When the URL access restriction is No, the user can freely designate a URL in the location area on the GUI screen of the WWW browser 113 and access any page. When the URL access restriction is Yes, the image display bookmark system 100 prohibits the user from designating a URL in the location area on the GUI screen of the WWW browser 113 and thereby prohibits the user from accessing other than pages that have been registered as bookmarks.

A default pixel parameter of the operation control parameter file 121 shown in FIG. 15A designates a default size of an image 221 displayed in the image display portion 220 on the bookmark display screen 200. In this example, each user cannot change the value of the default size. On the other hand, each user can designate the size of each image 221 on an image size change screen 510 shown in FIG. 6B. It should be noted that another unit that represents the size of each image 221 can be used instead of pixels.

In FIG. 15A, for simplicity, the operation control parameter file 121 is composed of one file. However, each parameter may be composed of each file.

Figure 5:
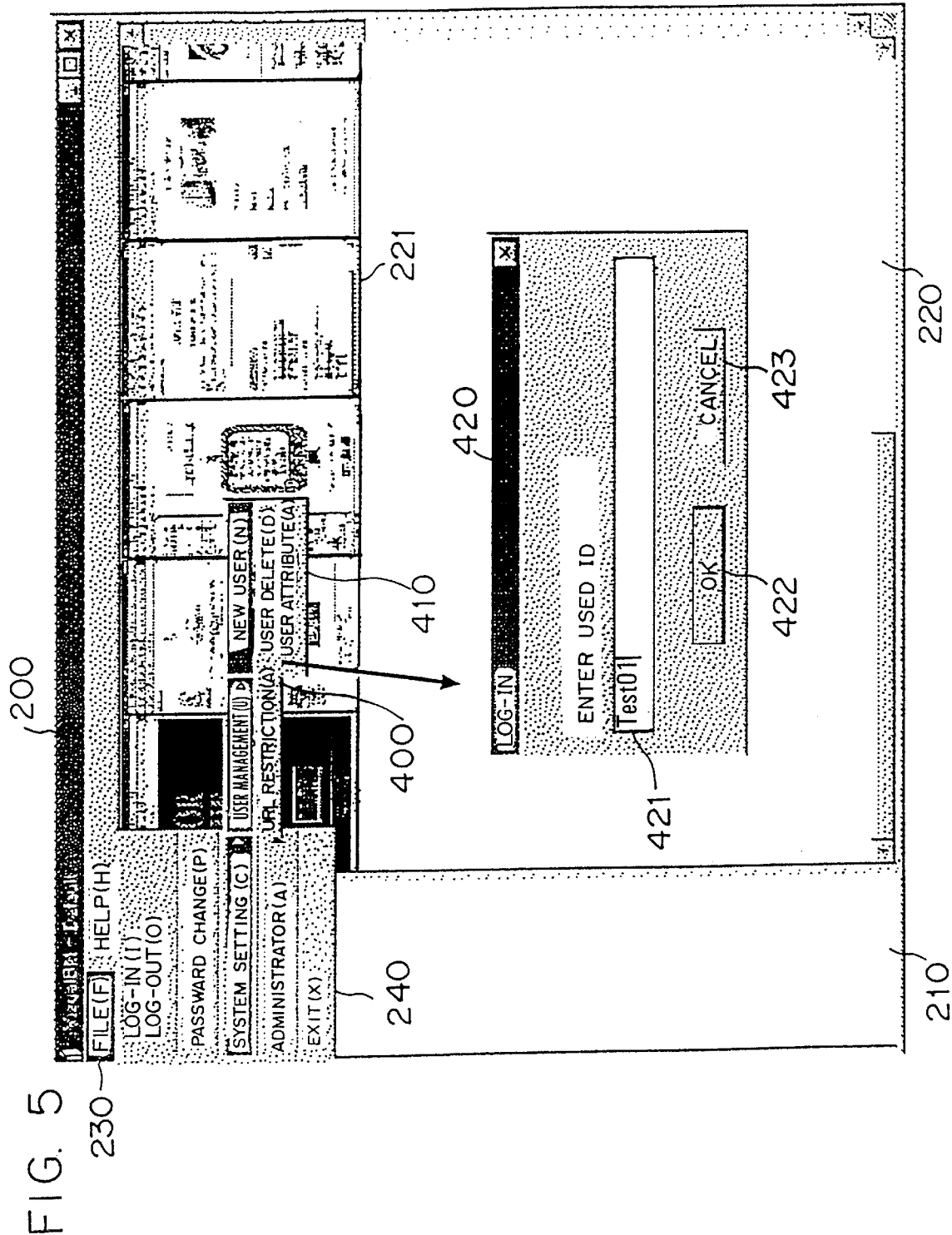
FIG. 5 is a diagram showing a user ID designation screen on the bookmark display screen of the image display bookmark system.

FIG. 5 shows a bookmark display screen 200 as with that shown in FIG. 3A. The bookmark display screen 200 has the menu portion 230, the folder display portion 210, the image display portion 220, and a plurality of images 221. When the user selects a system setting (C) portion on a pull-down menu 240 on the bookmark display screen 200 shown in FIG. 5, a user management (U) portion on a sub-menu 400, and a new user (N) portion on a sub-menu 410, the user management file editing unit 111b displays a new user ID designation screen 420 as a pop-up window shown in FIG. 5. The new user ID designation screen 420 is composed of a user ID input area 421, an OK button 422, and a cancel button 423. When the user selects the OK button 422, the user management file editing unit 111b adds a record having the user ID that has been input to the user ID input area 421 as a user name to the user management file 122 and closes the new user ID designation screen 420 after several check operations. This adding operation may be performed by all users of the WWW browser 113 or by only the system administrator thereof. When a record is added to the user management file 122, predetermined default values are designated to other items of the user name (for example, registration flag, image size, and so forth). When the user selects the cancel button 423, the user management file editing unit 111b closes the new user ID designation screen 420 without adding a new record to the user management file 122.

When the user selects a user delete (D) portion on the sub-menu 410, the user management file editing unit 111b displays a user ID designation screen (not shown) including a user ID designation area. When the user inputs a user ID to be deleted in the area and selects the OK button, the user management file editing unit 111b deletes a record corresponding to the input user ID from the user management file 122. If necessary, the user management file editing unit 111b deletes all records in association with the input user ID and closes the user ID designation screen. It is preferable to allow only the system administrator to perform this deleting operation. For security reason, it is possible to display a password designation screen after the user ID screen so that the user can input a password of a user ID to be deleted.

When the user selects the cancel button on the user ID designation screen, the user management file editing unit 111b closes the user ID designation screen without deleting a record from the user management file 122 and a record from the bookmark data file 123.

Figure 6A:
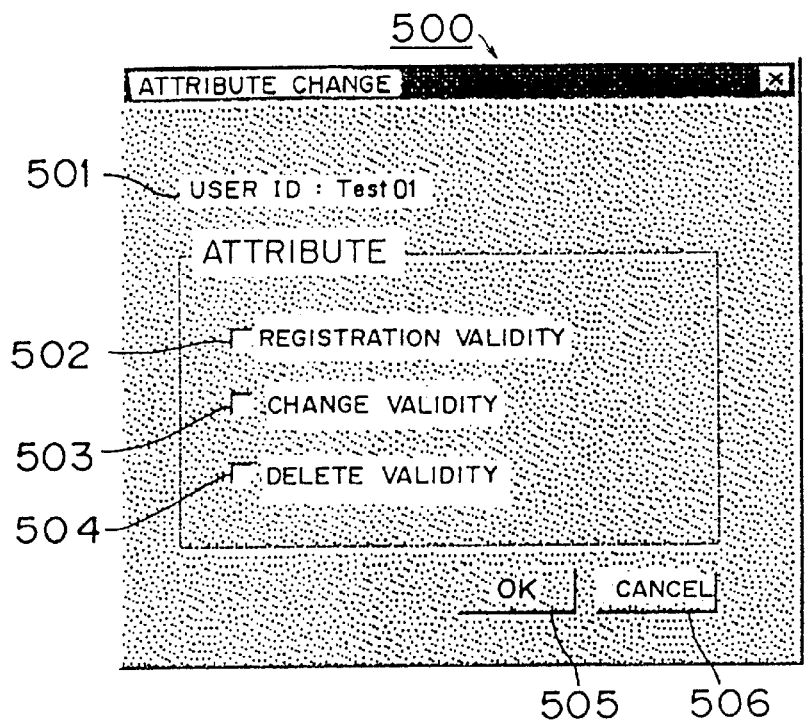
FIG. 6A is a diagram showing an attribute change screen.

FIG. 6A shows an attribute change screen 500. The attribute change screen 500 is composed of a user ID display area 501, a bookmark registration validity designation area 502, a bookmark change validity designation area 503, a bookmark delete validity designation area 504, an OK button, and a cancel button 506. The bookmark registration validity designation area 502, the bookmark change validity designation area 503, and the bookmark delete validity designation area 504 are displayed as check boxes.

When the user selects the system setting (C) portion of the pull-down menu 240 on the bookmark display screen 200 shown in FIG. 5 and a URL restriction (A) portion on the sub-menu 400, if the user who has logged in the system is the system administrator, the user management file editing unit 111b displays a screen (not shown) similar to the new user ID designation screen 420 that is the pup-up window shown in FIG. 5. When the user (namely, the system administrator) designates a user ID whom the system administrator prohibits from accessing URLs (or the default user ID in the case that the user ID mode parameter in the operation control parameter file 121 is No) and selects the OK button, the user management file editing unit 111b displays the attribute change screen 500 as the pop-up window shown in FIG. 6A. The user sets URL access restrictions (namely, rights to register, change, and delete bookmarks) to the designated user.

Only the system administrator can designate such restrictions. However, users other than the system administrator may designate such restrictions corresponding to predetermined criteria. Unless the user who has logged in is not the system administrator, he or she cannot select such a menu. Alternatively, when a user other than the system administrator selects such a menu, an error message or another proper message is displayed and he or she is substantially prohibited from using the attribute change screen 500. When the user management file editing unit 111b initially displays the attribute change screen 500, it shows the designated user ID in the user ID display area 501 as with the user ID designation screen 420. In addition, the user management file editing unit 111b displays the contents of the registration flag, change flag, and delete flag corresponding to the user ID and stored in the user management file 122, in the bookmark registration validity designation area 502, the bookmark change validity designation area 503, and the bookmark delete validity designation area 504, respectively. Since the registration flag, the change flag, and the delete flag have characters Yes or No, the user management file editing unit 111b displays check marks or non-check marks corresponding to the characters Yes or No in the bookmark registration validity designation area 502, the bookmark change validity designation area 503, and the bookmark delete validity designation area 504 on the attribute change screen 500.

When the user selects the OK button 505, the user management file editing unit 111b updates the registration flag, the change flag, and the delete flag of the record having the user ID displayed in the user ID display area 501 and stored in the user management file 122 to the values that have been input to the bookmark registration validity designation area 502, the bookmark change validity designation area 503, and the bookmark delete validity designation area 504, respectively and closes the attribute change screen 500, after several check operations. In this case, in the reverse manner, check marks or non-check marks of the check boxes 502 to 504 are converted into Yes or No. When the user selects the cancel button 506, the user management file editing unit 111b closes the attribute change screen 500 without updating any record in the user management file 122.

When the URL access restriction parameter of the operation control parameter file 121 is No, the registration flag, change flag, and delete flag of a record for each user in the user management file 122 become valid. When the registration flag is Yes, the user can register a desired page as a bookmark. When the registration flag is No, the user is prohibited from registering a desired page as a bookmark. Likewise, when the change flag or delete flag is Yes, the user can change or delete a bookmark. When the change flag or delete flag is No, the user is prohibited from changing or deleting a bookmark.

Figure 6B:
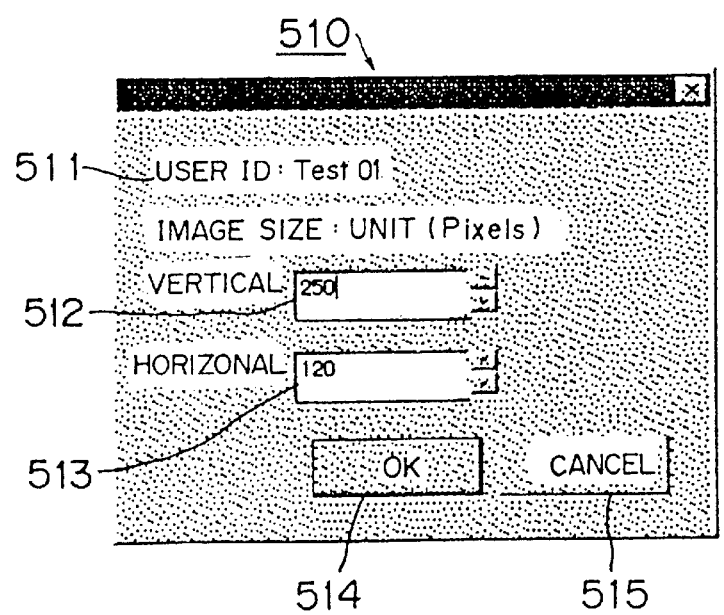
FIG. 6B is a diagram showing an image size change screen.

FIG. 6B shows an image size change screen 510. The image size change screen 510 is composed of a user ID display area 511, a size (vertical) designation area 512, a size (horizontal) designation area 513, an OK button 514, and a cancel button 515. When the user selects the system setting (C) portion from the pull-down menu 240 on the bookmark display screen 200 shown in FIG. 5, the user management (U) portion from the sub-menu 400, and a user attribute (A) from the sub-menu 410, the user management file editing unit 111b displays the image size change screen 510 as the pop-up window shown in FIG. 6B. When the user selects the OK button 514, the user management file editing unit 111b registers values in the size (vertical) designation area 512 and the size (horizontal) designation area 513 to a record having the user ID displayed in the user ID display area 511, stored in the user management file 122, after several check operations. In other words, the user management file editing unit 111b updates the image sizes x and y of the record stored in the user management file 122 to the values that have been input to the size (vertical) designation area 512 and the size (horizontal) designation area 513, respectively, and closes the image size change screen 510. The update operation may be available for all users of the WWW browser 113 or for only the system administrator thereof. When the user selects the cancel button 515, the user management file editing unit 111b closes the image size change screen 510 without updating any record in the user management file 122.

FIG. 7 shows a bookmark display screen 200 similar to that shown in FIG. 3A. The bookmark display screen 200 has the menu portion 230, the folder display portion 210, the image display portion 220, and a plurality of images 221. When the user selects the administrator (A) portion from the pull-down menu 240 on the bookmark display screen 200 shown in FIG. 7 and the log-in (I) portion from the sub-menu 600, the log-in controlling unit 111c displays a password designation screen 610 as the pop-up window shown in FIG. 7. The password designation screen 610 is composed of a password input area 611, an OK button 612, and a cancel button 613. When the user selects the OK button 612, the log-in controlling unit 111c checks out his or her password as the system administrator. The log-in controlling unit 111c compares the password of the system administrator that has been stored in a predetermined area with the password that has been input. When both the passwords match, the log-in controlling unit 111c closes the password designation screen 610 and completes the system administrator's log-in operation. When both the passwords do not match, the log-in controlling unit 111c outputs a predetermined error message.

When the user selects the administrator (A) portion from the pull-down menu 240 on the bookmark display screen 200 shown in FIG. 7 and the log-out (O) portion from the sub-menu 600, the log-in controlling unit 111c completes the system administrator's log-out operation for a new log-in operation.

Figure 8:
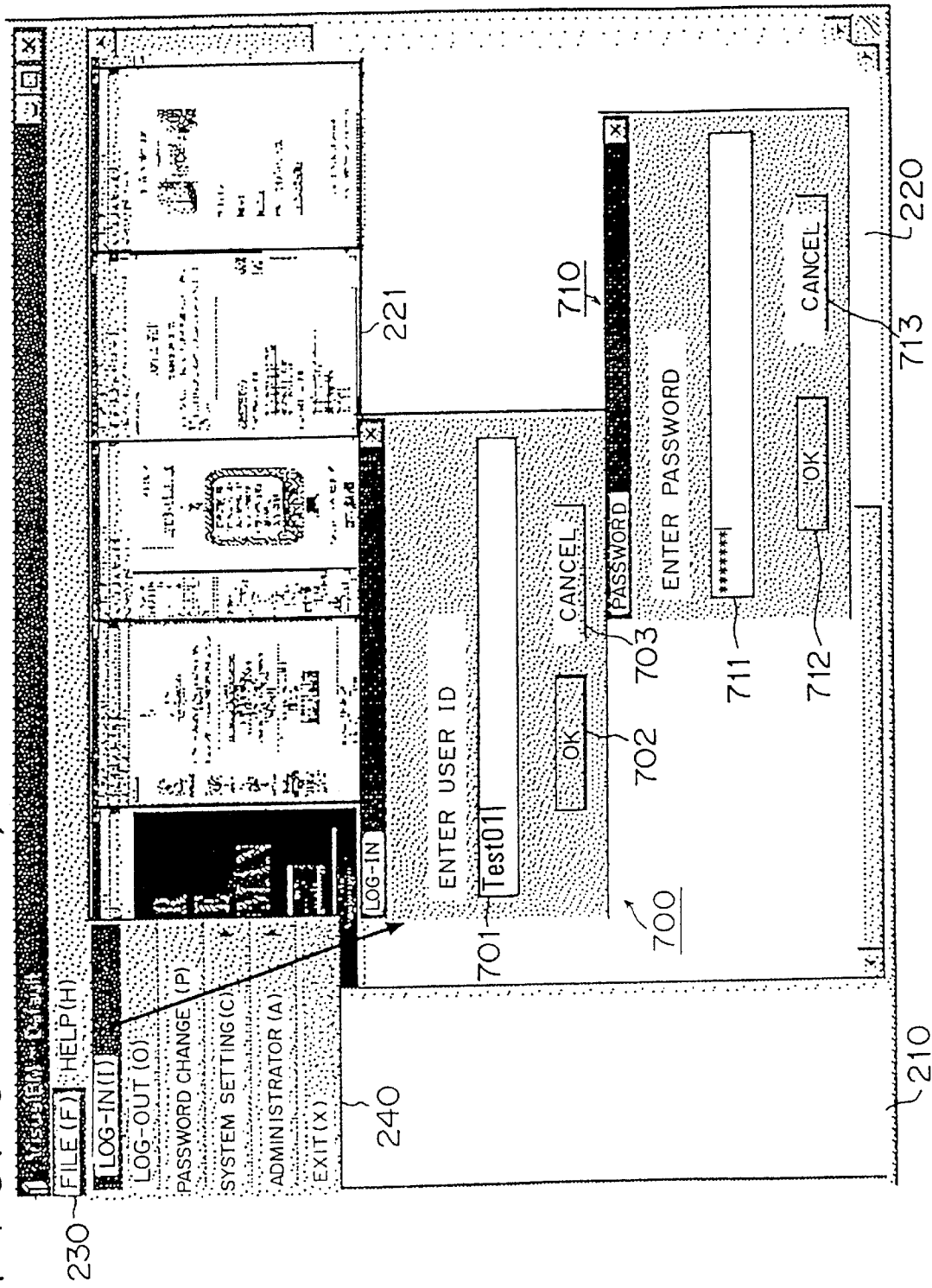
FIG. 8 is a user ID designation screen and a password designation screen of a general user on the bookmark display screen of the image display bookmark system.

FIG. 8 shows a bookmark display screen 200 similar to that shown in FIG. 3A. The bookmark display screen 200 has the menu portion 230, the folder display portion 210, the image display portion 220, and a plurality of images 221. When the user selects the log-in (I) portion from the pull-down menu 240 on the bookmark display screen 200 shown in FIG. 8, the log-in controlling unit 111c displays a user ID designation screen 700 as a first pop-up window shown in FIG. 8. The user ID designation screen 700 is composed of a user ID input area 701, an OK button 702, and a cancel button 703. When the user selects the OK button 702, the log-in controlling unit 111c displays a password designation screen 710 as a second pop-up window shown in FIG. 8.

When the user selects the cancel button 703, the log-in controlling unit 111c closes the user ID designation screen 700. Thus, the log-in controlling unit 111c does not perform the log-in operation. The password designation screen 710 is composed of a password input area 711, an OK button 712, and a cancel button 713. When the user selects the OK button 712, the log-in controlling unit 111c determines whether or not the record with the user name corresponding to the user ID that has been input on the user ID designation screen 700 is stored in the user management file 122 and whether or not the password of the record matches the password that has been input on the password designation screen 710. When the above-described conditions are not satisfied, the log-in controlling unit 111c displays a predetermined error message and prompts the user for the password in the password input area 711 on the password designation screen 710 or closes the user ID designation screen 700 and the password designation screen 710. When the user selects the cancel button 713, the log-in controlling unit 111c closes the user ID designation screen 700 and the password designation screen 710 without determining such conditions. Thus, the log-in controlling unit 111c does not perform the log-in operation. When the above-described conditions are satisfied, the log-in controlling unit 111c allows the user who has input the password to log in the image display bookmark system 100 as a general user. Thereafter, the user who has logged in the system can use the image display bookmark system 100 corresponding to the designated rights to register, change, and delete bookmarks.

Figure 9:
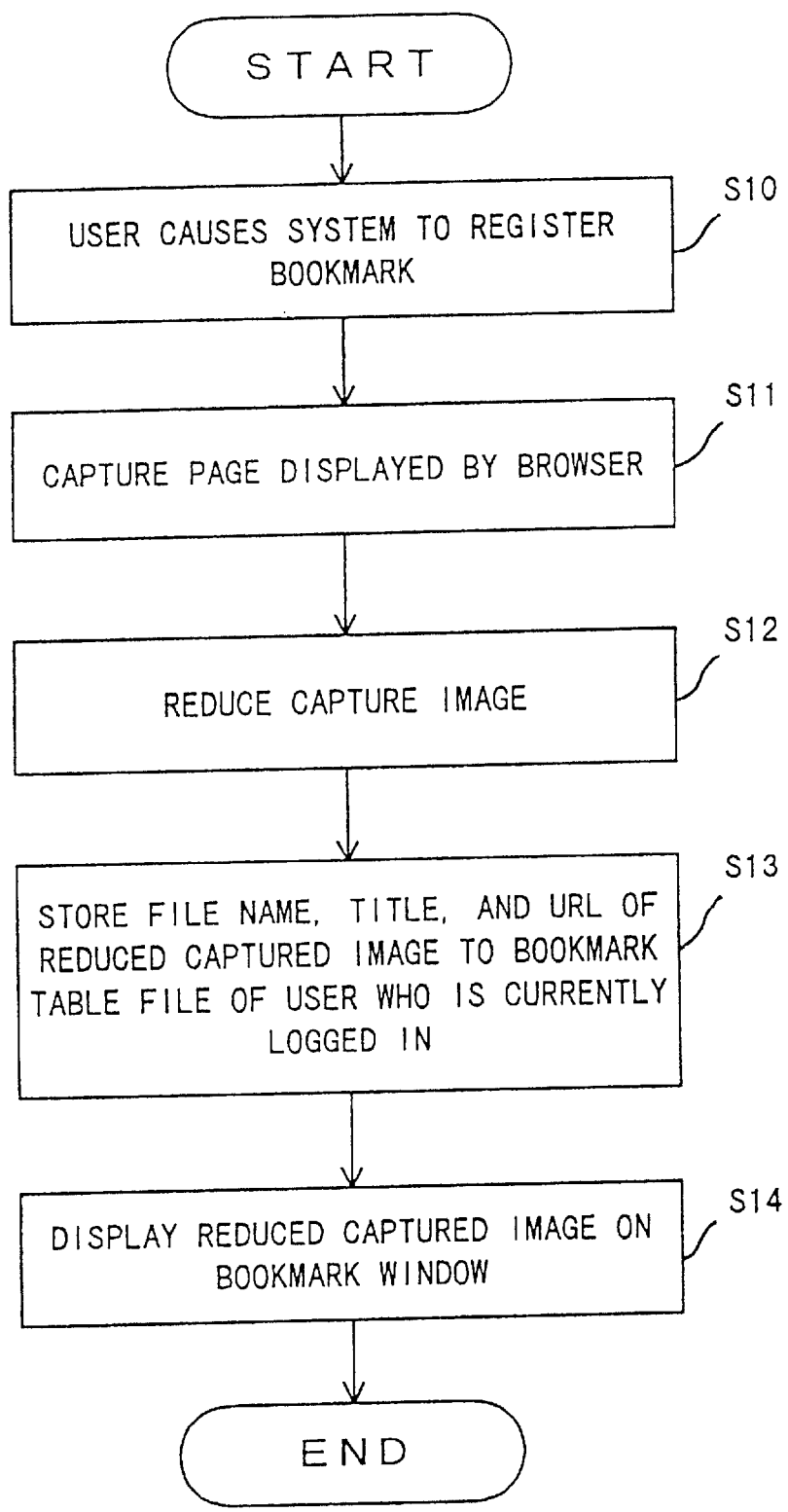
FIG. 9 is a flowchart showing a bookmark registering process.
Figure 10:
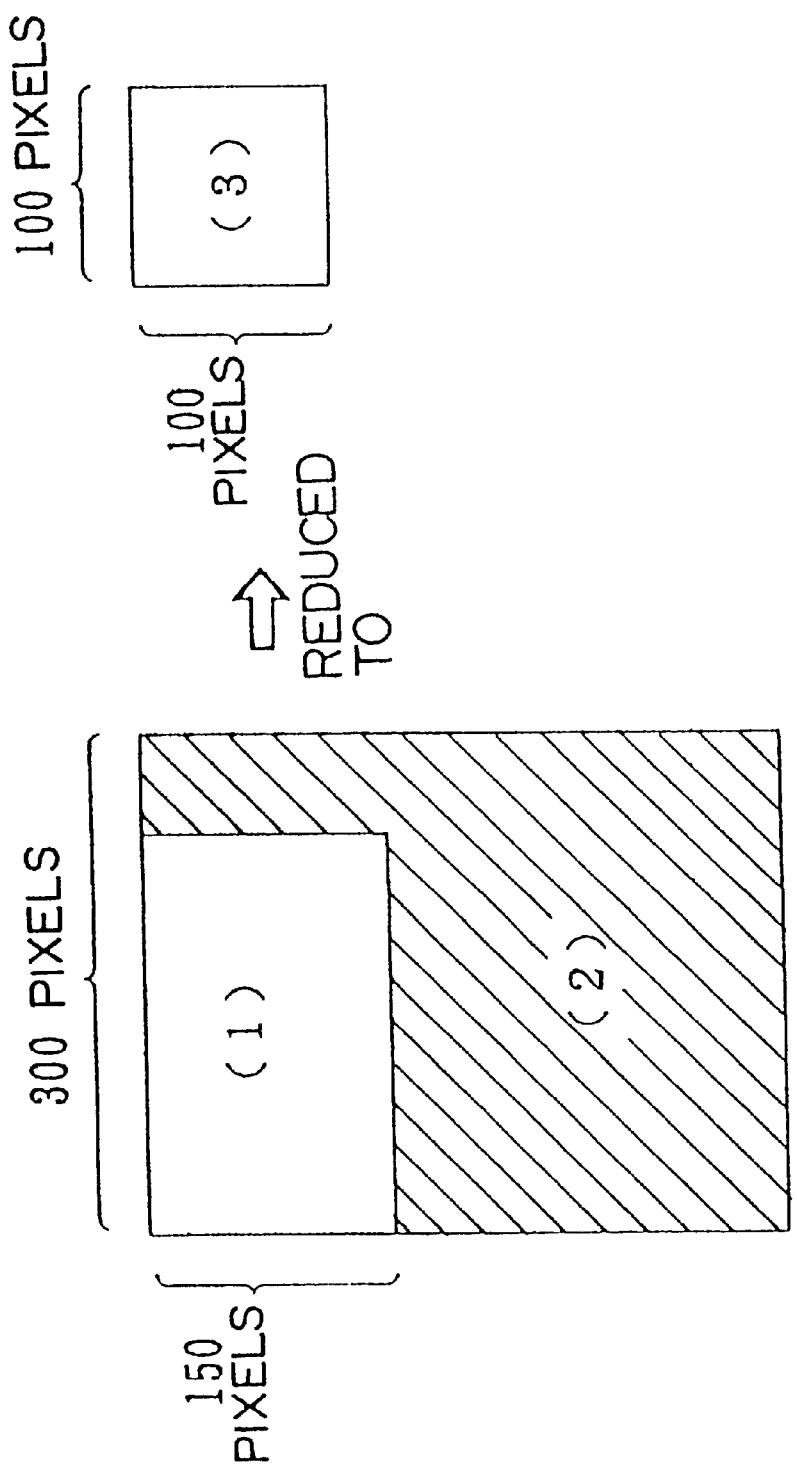
FIG. 10 is a schematic diagram showing an example of a reducing method of a captured image.

FIG. 9 is a flowchart showing a bookmark registering process. First, the user of the WWW browser 113 causes the system to register a bookmark (at step S10). In other words, when a desired page is displayed in the page display portion of the WWW browser 113, the user causes the system to register a bookmark of the page on the GUI screen of the WWW browser 113. At this point, the bookmark registering unit 111d gets started. The bookmark registering unit 111d captures (stores) image data of an active screen (active window) displayed on the page display portion to the storing unit such as a memory (at step S11). In this case, only data of the active screen displayed in the page display portion of the WWW browser is captured. The active screen represents a window on which the user can input data with the keyboard, mouse, and so forth in multi-window environment. If necessary, the bookmark registering unit 111d can capture the entire page or any part of the page including the active screen. In this case, a portion that is not displayed by the WWW browser 113 may be captured. Normally, the data is captured with the same quality as the display image (resolution and colors (for example, 256 colors, 8-bit gray scale, or one-bit monochrome)). However, depending on the capacity of the storing unit and the power of the CPU, the image quality can be degraded. Next, the bookmark registering unit 111d reduces the size of the captured image to the size (x, y) of the image designated in the record with the user name corresponding to the user ID that is stored in the user management file 122 and that is currently logged in (at step S12). FIG. 10 shows a method for reducing the size of a captured image. A hatched area (2) in FIG. 10 represents the original size of a page. An area (1) in FIG. 10 represents an area displayed in the page display portion on the GUI screen of the WWW browser 113. Although the size of the page display portion on the GUI screen of the WWW browser 113 can be changed, for simplicity, the page display portion is represented as the area (1) of 300 pixels (horizontal)×150 pixels (vertical). The image captured at step S11 is an image of the page displayed in the area (1). The image may be a part of the original page or the entire page thereof.

When the size (x, y) of the image obtained at step S12 is (100, 100) (namely, 100 pixels (horizontal)×100 pixels (vertical)), the area (1) is reduced to an area (3) shown in FIG. 10. In this reducing operation, the vertical size is converted from 150 pixels to 100 pixels, wherein the horizontal size is converted from 300 pixels to 100 pixels. Thus, the vertical size is reduced to ⅔ of the original vertical size, wherein the horizontal size is reduced to ⅓ of the original horizontal size. When the horizontal size is reduced to ⅓ of the original horizontal size, three pixels should be represented with one pixel. In this case, three pixels are converted into one pixel in a conventional manner. In other words, the average value of three pixels is calculated. Alternatively, one representative pixel is selected from three pixels.

Next, the bookmark registering unit 111d stores the file name, title, and URL of the reduced captured image to fields of the image file name, title, and URL of a new record of the bookmark data file 123 and stores the reduced captured image data to the reduced image data file 124 (at step S13). When the automatic traveling unit 111g determines whether or not the page has been updated, the latest update date/time of the content of the page should be obtained and stored as an initial value to the bookmark data file 123 or the like at the time the bookmark was newly registered. Thereafter, the bookmark display controlling unit 111e displays the reduced captured image to the image display portion 220 on the bookmark display screen 200 (at step S14).

Figure 11:
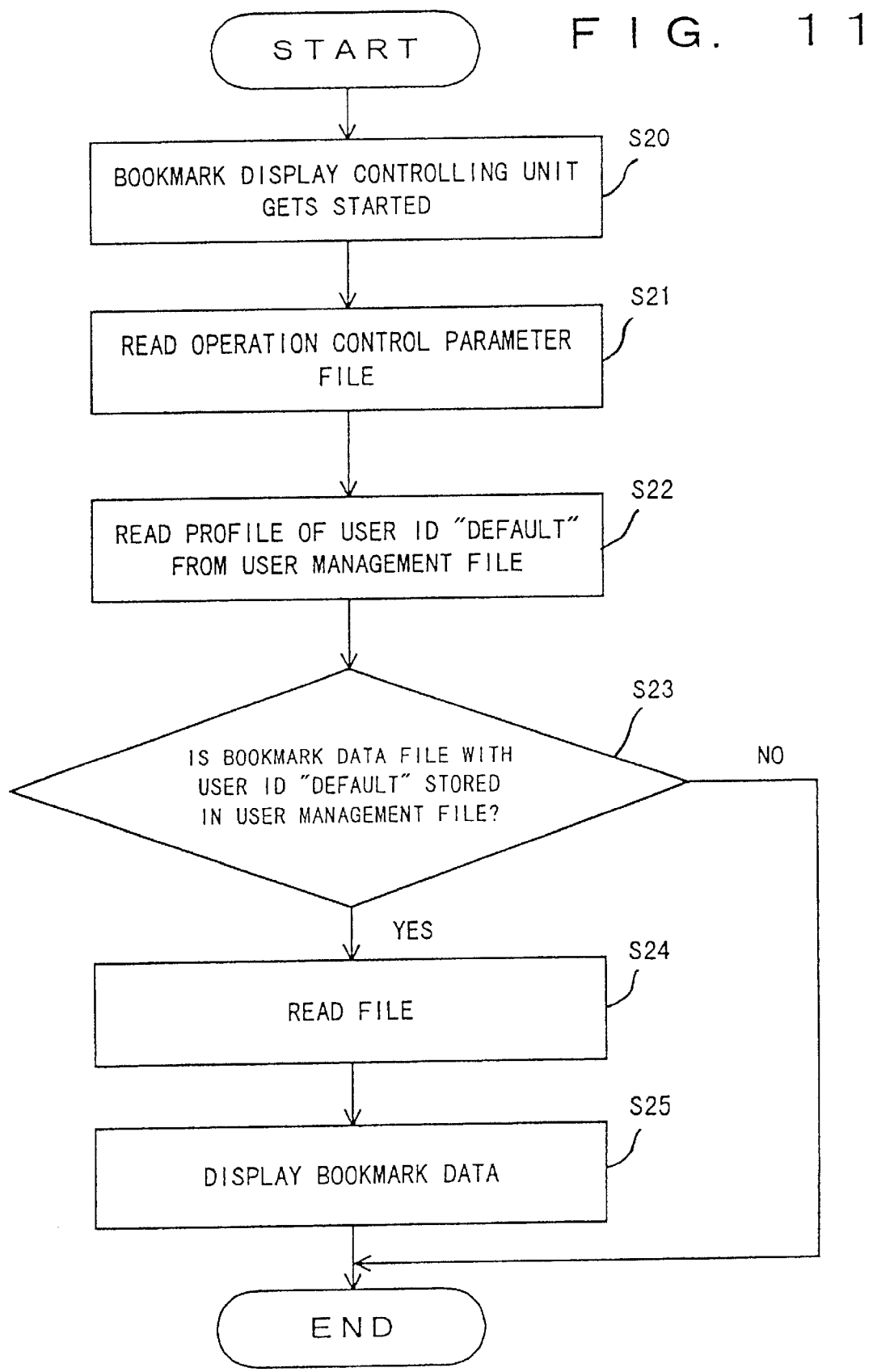
FIG. 11 is a flowchart showing a process for displaying a bookmark display screen.

Thereafter, the bookmark registering unit 111d stores the coordinates of each reduced captured image to an "image display coordinates" field of the relevant record in the bookmark data file 123. Thereafter, when each general user or the system administrator of the WWW browser 113 drags the image 221 with the mouse, the bookmark registering unit 111d automatically changes the content of the "image display coordinates" field corresponding to the display position of the image 221. However, in this example, each general user and the system administrator of the WWW browser 113 cannot change the content of the "image display coordinates" field directly. FIG. 11 is a flowchart showing a process in the case that the bookmark display controlling unit 111e gets started so as to display the bookmark edit screen 200 from the page display portion on the GUI screen of the WWW browser 113 (namely, the bookmark display controlling unit 111e gets started with the default user). The user causes the system to display the bookmark display screen 200. Thus, the bookmark display controlling unit 111e gets started (at step S20). The bookmark display controlling unit 111e reads the values of the control parameters in the operation control parameter file 121 (at step S21). Next, the bookmark display controlling unit 111e searches the user management file 122 for a record with the user name that is the same as the default user ID that has been read from the operation control parameter file 121 (at step S22).

Next, the bookmark display controlling unit 111e determines whether or not the record with the same user name as the default user ID is stored in the user management file 122 (at step S23). When the record is stored in the user management file 122 (namely, the determined result at step S23 is No), the bookmark display controlling unit 111e completes the process. When the record is stored in the user management file 122 (namely, the determined result at step S23 is Yes), the bookmark display controlling unit 111e reads image file names from all the records of the bookmark data file 123 with the default user ID (at step S24). Thereafter, the bookmark display controlling unit 111e reads image files with the image file names from the reduced image data file 124, displays the image files in the image display portion 220 on the bookmark display screen 200 (at step S25), and completes the process. At this point, the bookmark display controlling unit 111e registers the coordinates of the images to the "image display coordinates" fields in the relevant records of the bookmark data file 123 through the bookmark registering unit 111d.

Figure 12:
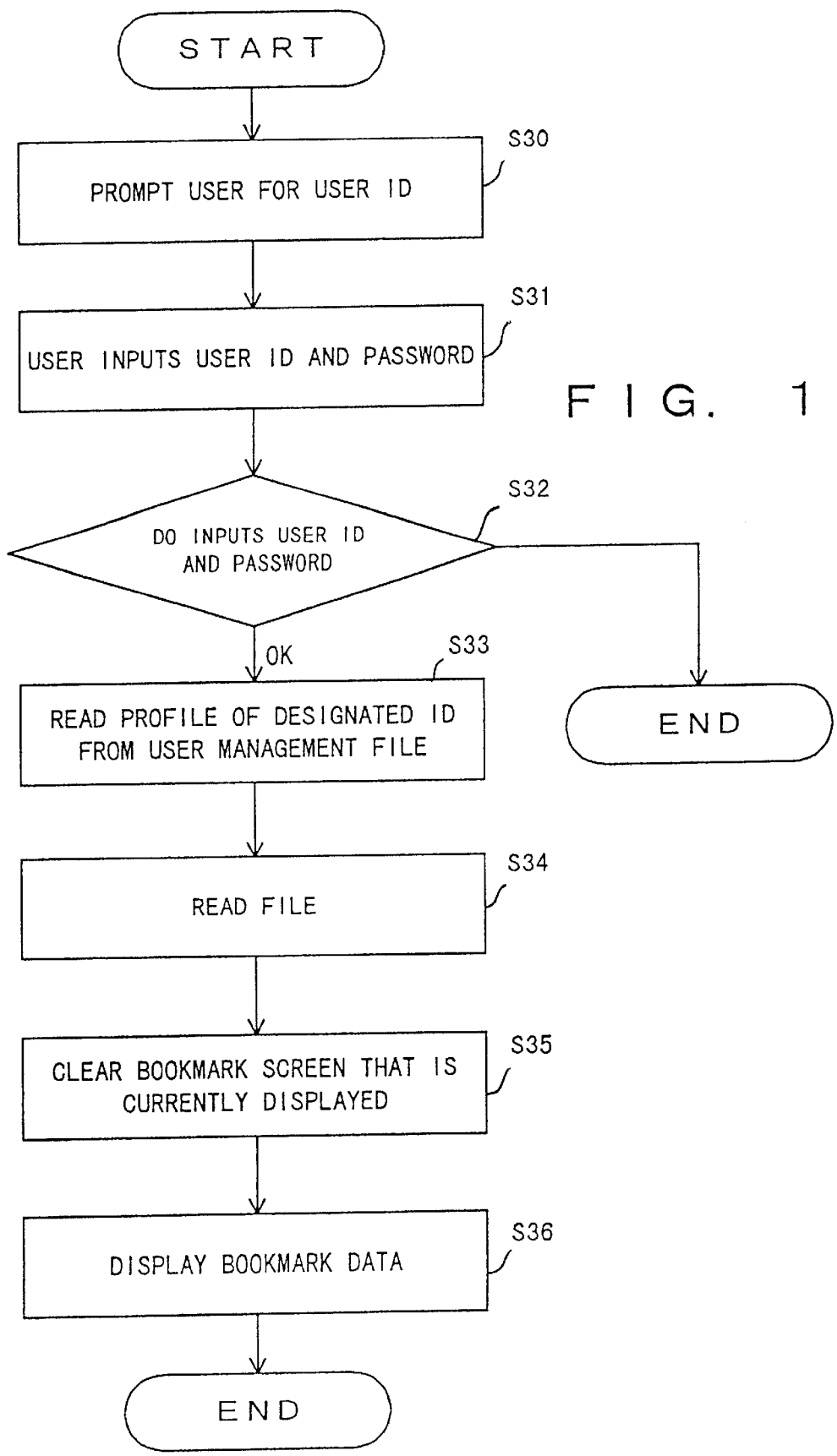
FIG. 12 is a flowchart showing a process for displaying a bookmark display screen of a general user ID.

FIG. 12 is a flowchart showing a process for displaying a bookmark corresponding to a user ID that a general user has input. When the user inputs the own user ID on the user ID designation screen 700 and selects the OK button 702, the log-in controlling unit 111c gets started (at step S30). Next, the log-in controlling unit 111c displays the password designation screen 710. The user inputs the own password in the password input area 711 (at step S31). The log-in controlling unit 111c compares the input password with the password of the record with the user ID in the user management file 122 (at step S32). When they do not match (namely, the determined result at step S32 is NG), the log-in controlling unit 111c completes the process.

When both the input user ID and password match those of the record (namely, the determined result at step S32 is OK), the bookmark display controlling unit 111e reads profile information such as registration flag, change flag, delete flag, and image size from the record with the user name in the user management file 122 (at step S33). Next, the bookmark display controlling unit 111e reads image file names from all records in the bookmark data file 123 with the user ID, reads image files with the image file names from the reduced image data file 124 (at step S34), and clears the folder display portion 210 and the image display portion 220 on the bookmark screen 200 that is currently displayed (at step S35). Thereafter, the bookmark display controlling unit 111e displays all the contents (images 221) in the reduced image data file 124 that has been read at step S34 as bookmark data in the image display portion 220 on the bookmark display screen 200 corresponding to a predetermined rule (at step S36) and completes the process. At this point, the bookmark display controlling unit 111e stores the coordinates of the images 221 to the "image display coordinates" fields of the relevant records of the bookmark data file 123.

Figure 13:
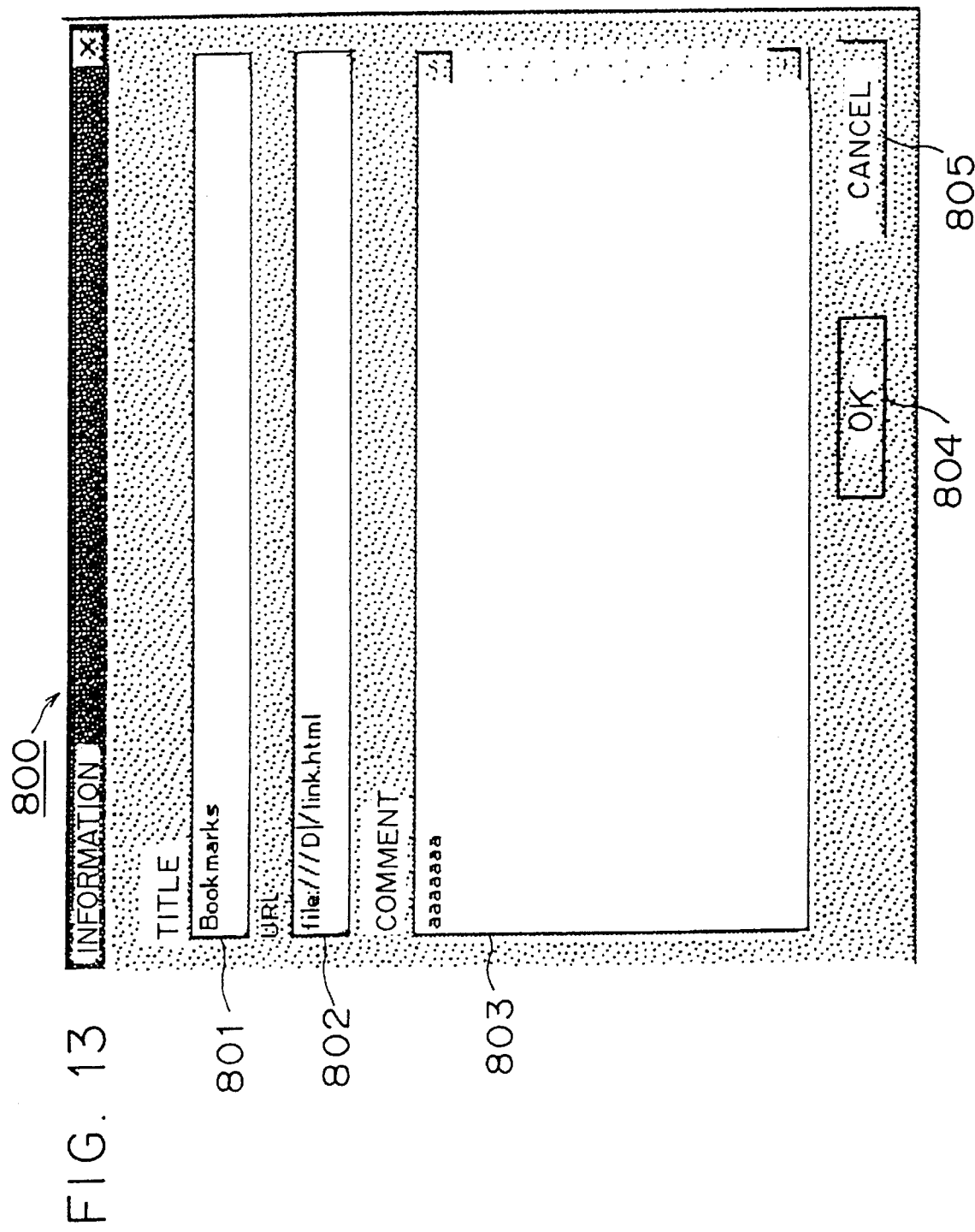
FIG. 13 is a diagram showing a bookmark data file edit screen.

FIG. 13 shows a bookmark data file edit screen 800. The bookmark data file editing unit 111f reads properties (title, URL, and comment) of an image 221 displayed in the image display portion 220 on the bookmark edit screen 200 from a relevant record of the bookmark data file 123 and displays the obtained properties. The bookmark data file edit screen 800 is composed of a title input area 801, a URL input area 802, a comment input area 803, an OK button 804, and a cancel button 805. When the user selects the OK button 804, the bookmark data file editing unit 111f updates the fields of the title, URL, and comment of the record that stores the data of the bookmark corresponding to the image 221 in the bookmark data file 123 to the input contents of the title input area 801, the URL input area 802, and the comment input area 803. For convenience, each user can freely change the title and comment. However, the user should carefully change the URL. Otherwise, the page to be accessed may be changed or lost. When the user selects the cancel button 805, the bookmark data file editing unit 111f completes the process without updating the bookmark data file 123.

Figure 14:
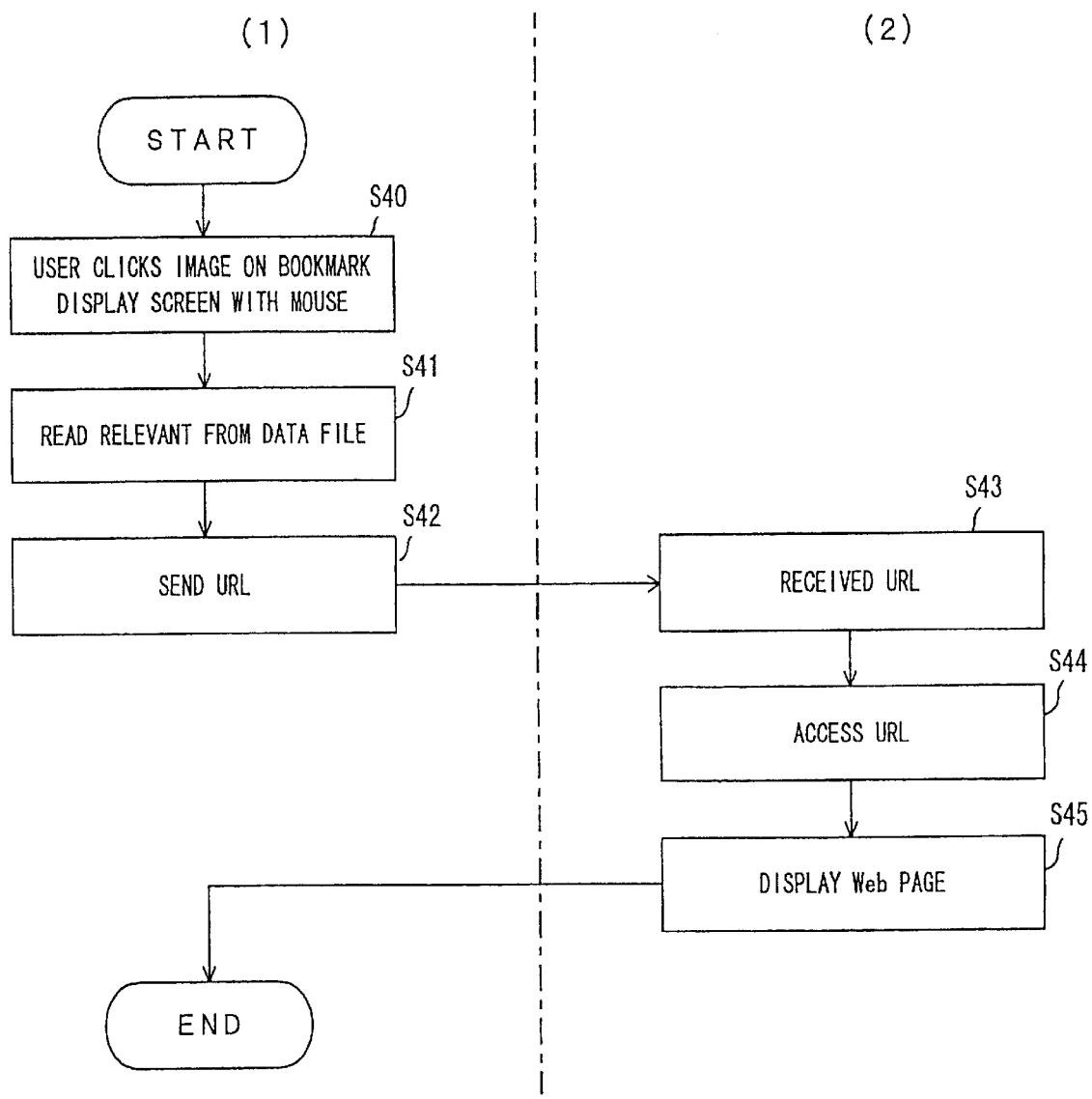
FIG. 14 is a flowchart showing processes from a bookmark selecting process to a page displaying process.

FIG. 14 is a flowchart showing a process for displaying a page on the page display portion on the GUI screen of the WWW browser 113 in the case a user clicks an image 221 corresponding to the page in the image display portion 220 on the bookmark display screen 200 with the mouse. The flowchart shown in FIG. 14 is divided into two sections (1) and (2). The section (1) is a function of the WWW page display controlling unit 111h according to the embodiment. The section (2) is a function of the WWW browser 113. When the user clicks one of the images 221 displayed in the image display portion 220 on the bookmark display screen 200 with the mouse (at step S40), the WWW page display controlling unit 111h reads a URL from the record corresponding to the image of the bookmark data file 123 based on the display coordinates of the image 221 (at step S41). Next, the WWW page display controlling unit 111h sends the obtained URL to the WWW browser 113 (at step S42). When the WWW browser 113 receives the URL (at step S43), the WWW browser 113 accesses the WWW server corresponding to the URL through the Internet 130, receives a page corresponding to the URL from the WWW server (at step S44), and displays the page to the page display portion on the GUI screen in the conventional method (at step S45). Thereafter, the WWW page display controlling unit 111h completes the process.

In FIG. 14, for simplicity, the flowchart is divided into two sections. However, the program and process are not always divided corresponding to the divided sections. Thus, the sending operation and the receiving operation of the URL at steps S42 and S43 may not be actually required.

When an automatic travel time period (minutes) corresponding to a predetermined value stored in the user management file 122 elapsed from the last travel date/time, the automatic traveling unit 111g automatically travels all pages corresponding to all bookmarks registered for each user (namely, bookmark data stored in the bookmark data file 123 for each user) through the Internet 130 and updates the existing reduced images and titles to the latest ones. As with the bookmark registering unit 111d, the automatic traveling unit 111g captures images of relevant pages, reduces the captured images, and stores the reduced images with image file names in relevant records of the bookmark data file 123 to the reduced image data file 124 so as to update the reduced images. Each user can designate the automatic travel time period for the automatic traveling operation to the user management file 122 on a predetermined edit screen. Whenever the automatic traveling unit 111g automatically travels the pages, it automatically updates the last travel date/time in the user management file 122. When the automatic travel time period elapsed, the automatic traveling unit 111g gets started in the conditions that the computer that executes the automatic traveling unit 111g is turned on and that the WWW browser 113 operates under the control of the computer. However, when the automatic travel time period elapsed, if the automatic traveling unit 111g does not get started because the above-described conditions are not satisfied, it gets started when the above-described conditions are satisfied.

When the automatic traveling unit 111g automatically travels the pages, addresses thereof (URLS) have been sometimes changed. Thus, a screen that shows an error message (for example, a message that represents that the relevant page cannot be found due to a change of the address) may be captured. However, when the web site has an HTML file with a predetermined hidden tag at the old address (URL), the automatic traveling unit 111g according to the embodiment can refer to the tag information so as to access the updated page. An example of the HTML file is "<RELOCATE DATE="1997/09/08 12:01:00"REURL= "http://www.xxx.ne.jp/" TYPE="HIDDEN">". "TYPE= "HIDDEN"" represents that the entire tag is not displayed on the browser. "DATE" represents the date and time of which the URL was changed. "REURL" represents the new URL. When the automatic traveling unit 111g receives the tag "<RELOCATE . . . >", it accesses the address (URL) represented by "REURL", obtains the title, URL, and reduced image of the page at the address, and updates the relevant record of the bookmark data file 123 and the reduced image data file 124 of the page to the latest contents. To display update information (that will be described later), the changed date/time designated by "DATE" and flag "1" are stored as update date/time and update flag to the bookmark data file 123 or the like (in the example of the bookmark data file 123 shown in FIG. 15C, portions corresponding to the update date/time and update flag are not shown).

When the address (URL) of a page is not changed, but the content of the page is changed, if the administrator of the page designates the latest update date/time with a hidden tag similar to the above-described tag "<RELOCATE . . . >" corresponding to a predetermined rule, the automatic traveling unit 111g can obtain the latest update date/time of the page. To display the update information (that will be described later), the automatic traveling unit 111g stores the latest update date/time to the bookmark data file 123 or the like. In addition, the automatic traveling unit 111g stores a flag that represents the last update date/time in the bookmark data file 123 or the like is different from the latest update date/time (namely, whether or not the page was updated in the preceding traveling operation) (for example, when the flag "1" represents that the page was changed, whereas the flag "0" represents that the page was not changed) as the update flag to the bookmark data file 123 or the like. When the bookmark registering unit 111d registers a bookmark, it should obtain the latest update date/time of the page and store the update date/time to the bookmark data file 123 or the like.

The automatic traveling unit 111g captures an image of the latest page every predetermined time period (minutes) defined in the user management file 122 and reduces the image. Thus, the bookmark display controlling unit 111e can display the latest reduced image 221 in the image display portion 220 on the bookmark display screen 200.

FIG. 15A shows the structure of the operation control parameter file 121. The operation control parameter file 121 stores operation control parameters that are user ID mode, URL access restriction, default user ID, and default pixels. The contents of these parameters are as described above.

FIG. 15B shows the structure of the user management file 122. The user management file 122 has records for individual users. Each record is composed of fields of "user name", "password", "registration flag", "change flag", "delete flag", "automatic travel time period (minutes)", "preceding travel date/time", and "image size". The contents of these fields are as described above.

FIG. 15C shows the structure of the bookmark data file 123 created for each user. The bookmark data file 123 has records for individual pages registered as bookmarks. Each record is composed of fields of "title", "URL", "image file name", "comment", and "image display coordinates". The contents of these fields are as described above.

The folder display portion 210 of the bookmark display screen 200 hierarchically displays folders 211. Information with respect to the hierarchical structure is kept by hierarchically storing bookmark data files 123 for individual users.

FIG. 15D shows the format of the reduced image data file 124 with "image file name" in the bookmark data file 123 stored in the data storing unit 120. Examples of image file names are such as "xxx1.bmp" and "xxx2.bmp" in BMP file format. However, it should be noted that the image file format is not limited to the above-described examples. Thus, any image file format available on the bookmark display screen 200 can be used.

FIG. 16A shows a bookmark display screen 200A displayed by an image display bookmark system according to a second embodiment of the present invention. The bookmark display screen 200A shown in FIG. 16A is the same as the bookmark display screen 200 shown in FIG. 3A except that a title update information display portion 900 is added to each image 221 in an image display portion 220A. The title/update information display portion 900 shown in FIG. 16B is composed of a title display portion 910 and an update information display portion 920. The title display portion 910 displays the title of an image 122 (namely, the title of a page). The update information display portion 920 displays update information. The title of the page in the title display portion 910 is displayed with the title of the page stored in the "title" field of a relevant record in the bookmark data file 123 by the bookmark display controlling unit 111e. In an example shown in FIG. 16B, a title "Yellow Pages" is displayed. As described above, the title of the page is stored in the "title" field of the relevant record of the bookmark data file 123 by the bookmark registering unit 111d. When the title was changed, the automatic traveling unit 111g updates the field. When the title of the page is displayed in the title display portion 910, the user can easily distinguish a bookmark. In addition, the user can easily distinguish a bookmark with a title displayed in the title display portion 910. With the title, even if a screen representing an error message due to an error (for example, time-over due to busy state of the WWW server and change of an address (URL) of a page), the user can easily identify a page.

When the automatic traveling unit 111g travels each page, it stores an update flag that represents that the content or address of the page was updated to the bookmark data file 123 or the like. The bookmark display controlling unit 111e displays a message (for example, "UPDATE") at a lower right portion (the update information display portion 920) of an image corresponding to each page in the image display portion 220A on the bookmark display screen 200A corresponding to the update flag. When the automatic traveling unit 111g has determined that the content or address of the page was not updated after the preceding traveling operation, the automatic traveling unit 111g clears the update flag stored in the bookmark data file 123 or the like. Thereafter, when the image display bookmark system 100 displays the bookmark display screen 200, the bookmark display controlling unit 111e clears the content of the update information display portion 920 corresponding to the update flag. Thus, the user can easily know whether or not the address or content of each page was updated after the preceding traveling operation.

The screen transition, screen structure, and file structure described above are only examples for explaining the present invention. Thus, those skilled in the art can easily use many other screen transitions, screen structures, and file structures.

The above-described embodiments were described corresponding to the operation of Microsoft Windows 95. However, it should be noted that the present invention is not limited to such a specific OS (Operating System). In other words, the present invention can be executed in any operating environment (platform) such as Apple's Mac OS and Sun Microsystems Solaris and Sun OS.

Moreover, in the above-described embodiments, pages were accessed through the Internet 130. However, the image display bookmark system according to the present invention can be applied when an HTML file on a local disk or an HTML file on a remote server connected through LAN, MAN, WAN, or the like is displayed in various system structures such as intranets and extranets.

Moreover, the present invention is not limited to an HTML file. Instead, the present invention can be applied to files written in VRML (Virtual Reality Modeling Language) and XML (extensible Markup Language).

Furthermore, individual parameters such as "automatic travel time period (minutes)", "preceding travel date/time", and "image size" can be separately stored in the bookmark data file 123 for each bookmark.

In addition, as a bookmark, an image designated by the user (namely, a clipped image) may be used instead of a reduced image of a page displayed on the WWW browser. Moreover, the system may automatically extract a feature portion from an image of the page and display the extracted image.

Furthermore, instead of a reduced image of a page, the original image thereof may be stored. When a list of bookmarks is displayed, the reduction rate of the original image may be automatically determined corresponding to the number of bookmarks being registered. Corresponding to the reduction rate, a reduced image of a page may be displayed.

Furthermore, these individual functions with respect to image display may be displayed as portions of a menu. With the menu, the user may select a desired display method.

Figure 17:
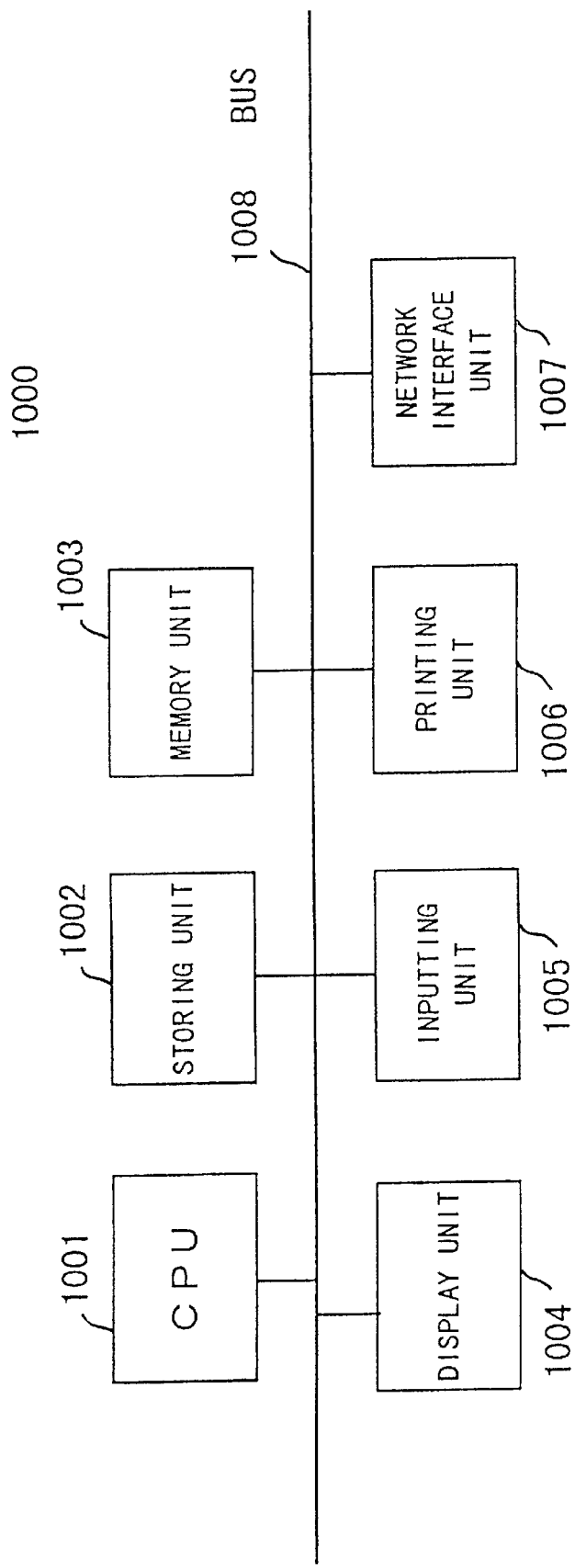
FIG. 17 is a block diagram showing the structure of a computer that executes the image display bookmark system.

FIG. 17 is a block diagram showing an example of the structure of a computer 1000 that accomplishes the above-described image display bookmark system 100. The computer 1000 is composed of a CPU 1001, a storing unit 1002, a memory unit 1003, a displaying unit 1004, an inputting unit 1005, a printing unit 1006, and a network interface unit 1007, each of which is connected to a bus 1008. The CPU 1001 is equivalent to the processing unit 110 shown in FIG. 2. The CPU 1001 performs data sending/receiving processes for displaying the bookmark display screens 200 and 200A and various processes corresponding to data that is input from the inputting unit 1005 in addition to the function of the conventional WWW browser 113. The storing unit 1002 is equivalent to the data storing unit 120 shown in FIG. 2. The storing unit 1002 stores the programs that accomplish the functions of the network interface unit 112 and the WWW browser 113 (executed by the CPU 1001) and the bookmark processing unit 111 of the image display bookmark system 100 according to the embodiments and individual files that are the operation control parameter file 121, the user management file 122, the bookmark data file 123, and the reduced image data file 124. If necessary, the bookmark processing unit 111, the WWW browser 113, the OS (not shown), and data that they use are loaded to the memory unit 1003. The displaying unit 1004 is equivalent to the displaying unit 160 shown in FIG. 2. The displaying unit 1004 is for example a CRT display that displays the page display portion of the GUI screen of the WWW browser 113, the bookmark display screens 200 and 200A, and so forth. The inputting unit 1005 is equivalent to the inputting unit 150 shown in FIG. 2. The inputting unit 1005 is composed of a keyboard, a mouse, and so forth with which the user inputs commands and data on the bookmark display screens 200 and 200A. The printing unit 1006 is for example a laser printer that prints data stored in the storing unit 1002 and so forth and data of the bookmark display screen 200 on the displaying unit 1006. The network interface unit 1007 is equivalent to the network interface unit 112 shown in FIG. 2. The network interface unit 1007 sends and receives data to/from a WWW server. The network interface unit 1007 is connected to the Internet 130 and sends/receives data and so forth of pages of web sites through the Internet 130. The bus 1008 is equivalent to the bus 140 shown in FIG. 2. The bus 1008 is a common communication path through which data, commands, and so forth are sent/received among the structural elements 1001 to 1007.

According to the present invention, a reduced image of a page to be registered as a bookmark can be registered as bookmark information. In addition, a list of reduced images is displayed as symbols for identifying bookmarks. Thus, each user does not need to identify a title composed of a long character string that may be written in a foreign language and that has a very small font for selecting a desired bookmark. Consequently, even an inexperienced user can easily identify and access a desired page.

In addition, all bookmarks for each user of the WWW browser can be restricted from being registered (added), deleted, and modified. Moreover, a general user can be prohibited from directly inputting an address (URL) of a page and accessing the page. Furthermore, pages registered as bookmarks are automatically accessed. Thus, the latest images, URLs, or titles of these pages can be obtained. Consequently, the bookmarks can be maintained in the latest condition.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image display bookmark system for managing bookmark information used by a WWW browser, comprising:
   a user designating unit enabling a specified operator to designate at least one user who can use corresponding user bookmark information;
   a creating unit creating the corresponding user bookmark information for the at least one user that includes at least image information for a reduced image of a page displayed by the WWW browser and address information of the page;
   a storing unit;
   a bookmark registering unit registering the corresponding user bookmark information created by said creating unit in said storing unit for each user designated by the user designating unit;
   a reading unit reading, in response to an operation by the at least one user, the corresponding user bookmark information stored in said storing unit;
   a bookmark display controlling unit displaying the reduced image for identifying the page on a screen corresponding to the image information included in the corresponding user bookmark information that has been read by said reading unit;
   a user authority defining unit defining user-specific authority for an editing operation of the corresponding user bookmark information by each user designated by the user designating unit; and
   a display prohibiting unit prohibiting each user designated by the user designating unit from displaying a full image of the page in other than an operation for selecting the reduced image displayed corresponding to the image information included in the corresponding user bookmark information in accordance with the user-specific authority for each user defined by said user authority defining unit.

2. The image display bookmark system as set forth in claim 1, wherein said user authority defining unit defines the user-specific authority to register and add the corresponding user bookmark information for each user.

3. The image display bookmark system as set forth in claim 1, wherein said user authority defining unit defines the user-specific authority to change the corresponding user bookmark information for each user.

4. The image display bookmark system as set forth in claim 1, wherein said user authority defining unit defines the user-specific authority to define the corresponding user bookmark information for each user.

5. The image display bookmark system as set forth in claim 1,
   wherein only a predetermined administrator can use said user authority defining unit.

6. An image display bookmark system for managing bookmark information used by a WWW browser, comprising:
   a user designating unit enabling a specified operator to designate at least one user who can use corresponding user bookmark information that includes at least image information for a reduced image of a page displayed by the WWW browser and address information of the page;
   a storing unit storing the corresponding user bookmark information for the at least one user;
   a reading unit reading, when the image information displayed on a screen is selected by the at least one user, the corresponding user bookmark information including the image information corresponding to the at least one user from said storing unit;
   an obtaining unit obtaining a full image of the page corresponding to the address information included in the corresponding user bookmark information that has been read by said reading unit;
   a WWW page display controlling unit displaying the full image of the page obtained by said obtaining unit on a screen;
   a user authority defining unit defining user-specific authority for an editing operation of the user bookmark information by each user designated by the user designating unit; and
   a display prohibiting unit prohibiting each user designated by the user designating unit from displaying a full image of the page in other than an operation for selecting the reduced image displayed corresponding to the image information included in the corresponding user bookmark information in accordance with the user-specific authority for each user defined by said user authority defining unit.

7. The image display bookmark system as set forth in claim 1, wherein only a predetermined administrator can use said user authority defining unit.

8. An image display bookmark system for managing bookmark information used by a WWW browser, comprising:

a user designating unit enabling a specified operator to designate at least one user who can respectively use user bookmark information that includes at least image information for a reduced image of a page displayed by the WWW browser and address information of the page;

a storing unit storing the user bookmark information for each user designated by the user designating unit;

a bookmark editing unit editing the user bookmark information;

a user authority defining unit defining user-specific authority for an editing operation of the user bookmark information by each user designated by the user designating unit; and a display prohibiting unit prohibiting each user designated by the user designating unit from displaying a full image of the page in other than an operation for selecting the reduced image displayed corresponding to image information included in the user bookmark information corresponding to the user-specific authority for each user defined by said user authority defining unit.

9. The image display bookmark system as set forth in claim 8, wherein said bookmark editing unit changes the address information included in the user bookmark information.

10. The image display bookmark system as set forth in claim 8, wherein said bookmark editing unit newly adds the user bookmark information.

11. The image display bookmark system as set forth in claim 8, wherein said bookmark editing unit deletes the user bookmark information.

12. The image display bookmark system as set forth in claim 8, wherein only a predetermined administrator can use said user authority defining unit.

13. An image display bookmark system for managing bookmark information used by a WWW browser, comprising:

a user designating unit enabling a specified operator to designate at least one user who can use corresponding user bookmark information that includes at least image information for a reduced image of a page displayed by the WWW browser and address information of the page;

a storing unit;

a bookmark registering unit registering the corresponding user bookmark information for each user designated by the user designating unit in said storing unit;

a bookmark display controlling unit reading, in response to an operation by the at least one user, the corresponding user bookmark information stored in said storing unit and displaying the reduced image for identifying the page corresponding to the image information included in the corresponding user bookmark information;

a user authority defining unit defining user-specific authority for an editing operation of the corresponding user bookmark information by each user designated by the user designating unit; and a display prohibiting unit prohibiting each user designated by the user designating unit from displaying a full image of the page in other than an operation for selecting the reduced image displayed corresponding to image information included in the corresponding user bookmark information in accordance with the user-specific authority for each user defined by said user authority defining unit.

14. The image display bookmark system as set forth in claim 13, further comprising a title information display controlling unit for displaying the title information of the page in the user bookmark information registered in said storing unit in such a manner that the title information correlates with the image for identifying the page that has been displayed.

15. The image display bookmark system as set forth in claim 13, wherein only a predetermined administrator can use said user authority defining unit.

16. An image display bookmark system for managing bookmark information used by a WWW browser, comprising:

a user designating unit enabling a specified operator to designate at least one user who can use corresponding user bookmark information that includes at least image information for a reduced image of a page displayed by the WWW browser and update information representing whether or not title information of the page, address information of the page or content of the page has been changed after preceding accessing operation has been performed;

a storing unit;

a bookmark registering unit registering the corresponding user bookmark information for each user designated by the user designating unit in said storing unit;

a bookmark display controlling unit reading, in response to an operation made by the at least one user, the corresponding user bookmark information stored in said storing unit and displaying the reduced image for identifying the page corresponding to the image information included in the corresponding user bookmark information and information corresponding to the update information together on a screen;

a user authority defining unit defining user-specific authority for an editing operation of the corresponding user bookmark information by each user designated by the user designating unit; and a display prohibiting unit prohibiting each user designated by the user designating unit from displaying a full image of the page in other than an operation for selecting the reduced image displayed corresponding to image information included in the corresponding user bookmark information in accordance with the user-specific authority for each user defined by said user authority defining unit.

17. The image display bookmark system as set forth in claim 16, wherein only a predetermined administrator can use said user authority defining unit.

18. An image display bookmark system for managing bookmark information used by a WWW browser, comprising:

a user designating unit enabling a specified operator to designate at least one user who can respectively use user bookmark information that includes at least image information for a reduced image of a page displayed by the WWW browser and address information of the page;

a storing unit storing the user bookmark information for each user designated by the user designating unit;

an accessing unit automatically accessing, according to predetermined time information, a page of an address designated by the address information included in the user bookmark information for each user stored in said storing unit, and obtaining update information of the image of the page when available;

a registering unit updating the image information included in the user bookmark information according to the update information when obtained by said accessing unit and registering the updated user bookmark information in said storing unit;

a user authority defining unit defining user-specific authority for an editing operation of the user bookmark information by each user designated by the user designating unit; and a display prohibiting unit prohibiting each user designated by the user designating unit from displaying a full image of the page in other than an operation for selecting the reduced image displayed corresponding to image information included in the user bookmark information corresponding to the user-specific authority for each user defined by said user authority defining unit.

19. The image display bookmark system as set forth in claim 18,
    wherein the change information is information that represents that a display content of the page has been changed.

20. The image display bookmark system as set forth in claim 18,
    wherein the change information is information that represents that an address of the page has been changed.

21. The image display bookmark system as set forth in claim 18,
    wherein the change information is information that represents that a title of the page has been changed.

22. The image display bookmark system as set forth in claim 18,
    wherein the change information is information that represents that at least two of a display content of the page, an address thereof, and a title thereof have been changed.

23. The image display bookmark system as set forth in claim 18, wherein said accessing unit accesses an address of address change information that represents a new address of the page and obtains change information of the page when the page of the address represented by the address information of the page included in the user bookmark information stored in the storing unit is accessed.

24. The image display bookmark system as set forth in claim 18,
    wherein only a predetermined administrator can use said user authority defining unit.

25. A method for displaying and selecting bookmark information used by a WWW browser, comprising:
    designating at least one user who can use corresponding user bookmark information that includes at least image information for a reduced image of a page displayed by the WWW browser and address information of the page;

registering the corresponding user bookmark information for each designated user in a storing unit;

displaying, according to an operation by the designated user, the reduced image for identifying the page corresponding to the image information included in the corresponding user bookmark information registered in the storing unit on a screen of a displaying unit;

reading, when the reduced image for identifying the page is selected by the designated user, the corresponding user bookmark information including image information corresponding to the selected image from the storing unit, obtaining a full image of the page at an address designated by the address information included in the user bookmark information that has been read, and displaying on the screen the full image of the page obtained at the address;

defining user-specific authority for an editing operation of the corresponding user bookmark information by each designated user; and prohibiting each designated user, according to the user-specific authority for each designated user, from displaying the full image of the page in other than an operation for selecting the reduced image for identifying the page.

26. A computer-readable storage medium used to direct a computer to perform a method for managing bookmark information used by a WWW browser, the method comprising:
    designating at least one user who can use corresponding user bookmark information that includes at least image information for a reduced image of a page displayed on a screen of a displaying unit by the WWW browser program and address information of the page;

registering the corresponding user bookmark information for each designated user in a storing unit;

reading, according to an operation by the designated user, the image information of the page included in the corresponding user bookmark information from the storing unit and displaying the reduced image for identifying the page corresponding to the image information on the screen of the displaying unit;

reading, when the reduced image for identifying the page is selected by the designated user, the corresponding user bookmark information including image information corresponding to the selected image from the storing unit, obtaining a full image of a page at an address designated by address information included in the corresponding user bookmark information that has been read, and displaying the full image of the page on the screen of the displaying unit;

defining user-specific authority for an editing operation of the corresponding user bookmark information by each designated user; and prohibiting each designated user, according to the user-specific authority for each designated user, from displaying an image of the page in other than an operation for selecting the reduced image for identifying the page.

* * * * *